US010193974B2

(12) United States Patent
Rudrawar et al.

(10) Patent No.: US 10,193,974 B2
(45) Date of Patent: Jan. 29, 2019

(54) MANAGING COLLABORATION OF SHARED CONTENT USING COLLABORATOR INDEXING

(71) Applicant: Box, Inc., Los Altos, CA (US)

(72) Inventors: Kaustubh Rudrawar, San Jose, CA (US); Girish Kanna Balakrishnan, Mountain View, CA (US); Wing Li, Milpitas, CA (US); Wei Zhao, Sunnyvale, CA (US)

(73) Assignee: Box, Inc., Redwood City, CA (US)

( * ) Notice: Subject to any disclaimer, the term of this patent is extended or adjusted under 35 U.S.C. 154(b) by 188 days.

(21) Appl. No.: 14/973,518

(22) Filed: Dec. 17, 2015

(65) Prior Publication Data

US 2017/0180476 A1    Jun. 22, 2017

(51) Int. Cl.
*H04L 29/08* (2006.01)
*G06F 17/30* (2006.01)

(52) U.S. Cl.
CPC .... *H04L 67/1097* (2013.01); *G06F 17/30339* (2013.01); *G06F 17/30365* (2013.01); *G06F 17/30864* (2013.01)

(58) Field of Classification Search
CPC .......... H04L 67/1097; G06F 17/30339; G06F 17/30365; G06F 17/30864
USPC ...................................................... 709/225
See application file for complete search history.

(56) References Cited

U.S. PATENT DOCUMENTS

| 2007/0022125 | A1* | 1/2007 | Salam | G06F 17/30864 |
| 2008/0120321 | A1* | 5/2008 | Liu | G06F 17/30463 |
| 2009/0063990 | A1* | 3/2009 | Morris | G06F 17/30864 715/751 |
| 2009/0138808 | A1* | 5/2009 | Moromisato | G06Q 10/10 715/758 |
| 2012/0131104 | A1* | 5/2012 | Beaven | G06Q 10/0637 709/204 |
| 2014/0280605 | A1* | 9/2014 | Zhang | H04L 67/1095 709/205 |

\* cited by examiner

*Primary Examiner* — Nicholas R Taylor
*Assistant Examiner* — Meng Vang
(74) *Attorney, Agent, or Firm* — Vista IP Law Group, LLP

(57) ABSTRACT

Methods, media, and systems for managing access to shared content in a cloud-based service platform. Embodiments operate in a cloud-based environment that comprises storage devices that store content objects accessible by two or more users. The content objects have respective object path attributes and one or more object parent attributes. A server processes collaboration transactions to associate content object sharing between two or more users. Upon receipt of a collaboration transaction such as an invitation, a server generates a set of collaborator index attributes to relate the two or more users to share the selected content object, and the generated collaborator index attributes are added as rows in a collaborator index. Pre-existing rows in the collaborator index that pertain to the two or more users are not updated. Very large sets of collaboration objects and/or very large sets of users can be managed efficiently by re-indexing only the added rows.

20 Claims, 16 Drawing Sheets

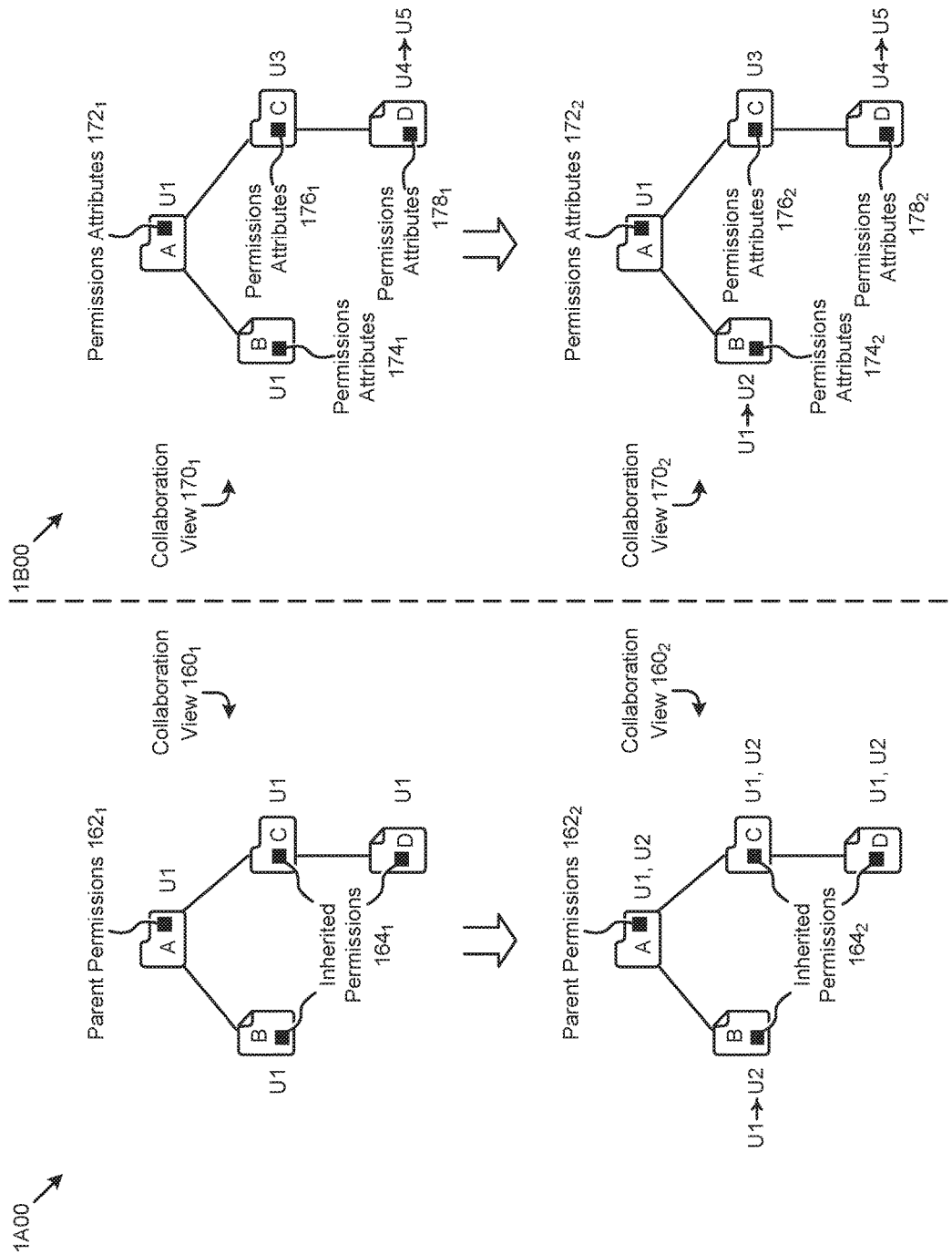

MANAGING COLLABORATION OF SHARED CONTENT USING COLLABORATOR INDEXING

FIELD

This disclosure relates to managing access to shared content in a cloud-based service platform, and more particularly to techniques for managing collaboration of shared content using collaborator indexing.

BACKGROUND

Enterprise computing often involves sharing of documents between authors, creators, editors, reviewers, and other stakeholders. Upon the advent of email communications (e.g., with users having unique addresses) and computer-readable documents (e.g., text files, presentations, spreadsheets, mixed text and graphics documents, etc.), attachments to email became the norm for disseminating information both internal to and external to an organization. Such methods of disseminating information can precipitate the situation where there are many copies of the same document(s), and some agreement had to be reached among the collaborators for keeping track of which copy should be considered the source or "true" copy. This need, and improvements in various technologies gave way to a sharing or collaboration model where there exists a single true source copy of a document, and all collaborators agree on a check-in/check-out procedure. Over time, the check-in/check-out procedure became semi-automated or fully-automated, and collaborators merely agreed to collaborate within the bounds of the semi-automated or fully-automated environment. Such a collaboration model, where collaborators merely agree to collaborate within the bounds of the semi-automated or fully-automated environment (e.g., using a shared document repository and a set of access rules), can be configured to handle a wide range of objects (e.g., text files, presentations, spreadsheets, mixed text and graphics documents, etc.) and containers (e.g., folders, directories, etc.).

The concept of a hierarchy of containers that can contain objects and/or other containers (and so on), coupled with the notion of inheritance of access permissions when traversing down a given hierarchy (e.g., permissions "waterfall"), simplifies the codification of access rules. For example, if a creator collaborator produces a folder container that is tagged as being accessible to other collaborators in some group, and the creator collaborator places objects into that folder, then by applying the concept of inheritance, the objects in the folder inherit the accessibility of the parent folder. Additional containers (e.g., child folders) can be created within a parent folder, and so on to form a regime of hierarchical access.

Many cloud-based services and platforms rely on such access permissions to deliver various capabilities. Specifically, cloud-based content management services and platforms have impacted the way personal and corporate electronically stored information objects (e.g., files, images, videos, etc.) are stored, and has also impacted the way such personal and corporate content is shared and managed. One benefit of using such cloud-based systems is the ability to securely share content among trusted collaborators on a variety of user devices such as mobile phones, tablets, laptop computers, desktop computers, and/or other devices. Certain cloud-based shared content management platforms might further provide document creation applications for such user devices so as to facilitate use models where collaborators create and/or edit documents within the cloud-based platform for real-time sharing.

Unfortunately, the collaboration capability desired by users of today's cloud-based shared content management services and platforms involves collaborator and/or content relationships that are not hierarchical in nature, thus the legacy hierarchical access techniques are deficient. Furthermore, a given collaborator (e.g., inviter) may want to quickly view the users that can potentially collaborate on certain content (e.g., based on associated permission sets) and may want to invite any such user (e.g., invitee) to collaborate on the content. As the number of users and/or content objects and/or permission sets increase in a cloud-based shared content environment, legacy approaches to content collaboration (e.g., for determining the extent of collaborators over a particular document) are limited at least in their ability to respond to such queries for available collaborators in a time period and to an accuracy level that is acceptable to the users.

What is needed is a technique or techniques to improve over legacy approaches.

SUMMARY

The present disclosure provides a detailed description of techniques used in systems, methods, and in computer program products for managing collaboration of shared content using collaborator indexing.

The present disclosure provides systems, methods, and computer program products suited to address the aforementioned issues with legacy approaches. More specifically, the present disclosure provides a detailed description of techniques used in systems, methods, and in computer program products for managing collaboration of shared content using collaborator indexing. Certain embodiments are directed to technological solutions for efficient tracking of user collaborations to facilitate fast identification of users available for collaboration, which embodiments advance the relevant technical fields as well as advancing peripheral technical fields. The disclosed embodiments modify and improve over legacy approaches. In particular, the herein-disclosed techniques provide technical solutions that address the technical problems attendant to efficiently identifying candidate collaborators and managing collaborations in a cloud-based shared content environment having large numbers of users, collaborations, content objects, and/or permission sets. Such technical solutions serve to reduce use of computer memory, reduce demand for computer processing power, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of high-performance computing as well as advances in various technical fields related collaboration systems.

Embodiments operate in a cloud-based environment that comprises storage devices that store content objects accessible by two or more users. The content objects have respective object path attributes and one or more object parent attributes. A server processes collaboration transactions to associate content object sharing between two or more users. Upon receipt of a collaboration transaction such as an invitation, a server generates a set of collaborator index attributes to relate the two or more users to share the selected content object, and the generated collaborator index attributes are added as rows in a collaborator index. Pre-existing rows in the collaborator index that pertain to the two or more users are not updated. Very large sets of collaboration objects and/or very large sets of users can be managed efficiently by re-indexing only the added rows.

Further details of aspects, objectives, and advantages of the technological embodiments are described herein and in the following descriptions, drawings, and claims.

BRIEF DESCRIPTION OF THE DRAWINGS

The drawings described below are for illustration purposes only. The drawings are not intended to limit the scope of the present disclosure.

FIG. 1A depicts a hierarchical collaboration permissions technique.

FIG. 1B depicts a user-based collaboration permissions technique as implemented in systems for managing collaboration of shared content using collaborator indexing, according to some embodiments.

DETAILED DESCRIPTION

Figure 1C:
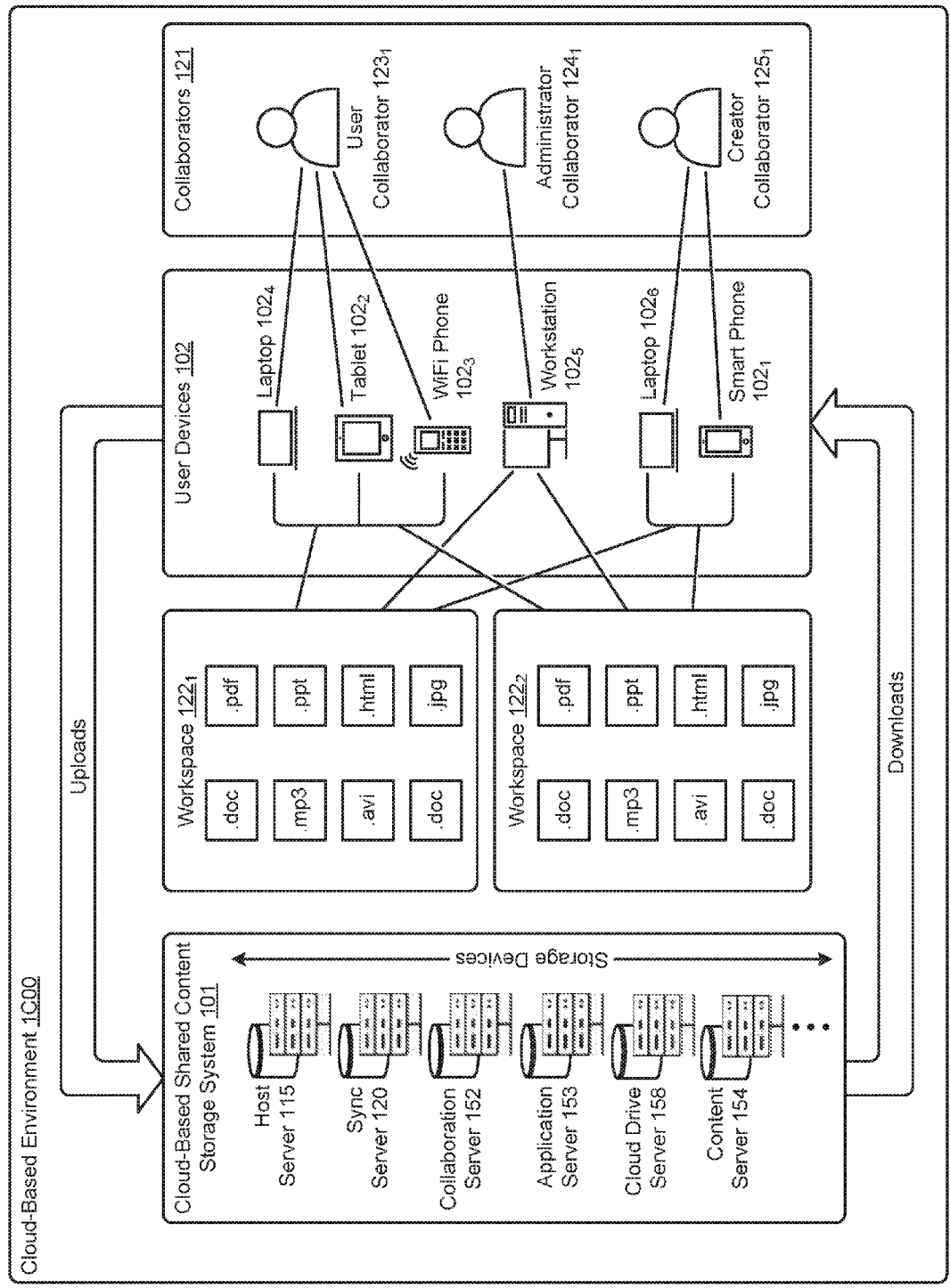
FIG. 1C presents a cloud-based environment, including a cloud-based shared content management platform, for managing collaboration of shared content using collaborator indexing, according to some embodiments.

Some embodiments of the present disclosure address the problem of efficiently identifying candidate collaborators and managing collaborations in a cloud-based shared content environment having large numbers of users, collaborations, content objects, and/or permission sets and some embodiments are directed to approaches for using a collaborator indexing technique to facilitate efficient tracking of user collaborations to further enable fast identification of users available for collaboration. More particularly, disclosed herein and in the accompanying figures are exemplary environments, systems, methods, and computer program products for managing collaboration of shared content using collaborator indexing.

Overview

Disclosed herein are techniques for recording certain collaboration attributes associated with each collaborator using a collaborator indexing scheme to efficiently perform or facilitate collaboration management operations such as collaboration creation (e.g., processing invitations), collaboration modification (e.g., processing changes in collaborator roles and permissions), and/or collaboration deletion. The herein-disclosed collaborator index can further facilitate improved querying for users that are available for collaboration. Such querying can involve simple queries and or more complex queries that are based, for example, on sets of pre-existing permissions for the users. More specifically, in one or more embodiments, various servers in a cloud-based environment can interface with storage devices that store content objects accessible by multiple users. Certain collaboration transaction attributes can be received by the servers, which collaboration transaction attributes characterize various collaboration transactions associated with certain users (e.g., invitees) being invited to collaborate on certain collaboration objects. Such collaboration transaction attributes can be used to generate a set of collaborator index attributes for building a collaborator index, which index is in turn used for servicing collaboration operations over the shared content objects. In some embodiments, the collaborator index attributes can comprise information associated with the invitee, the collaboration object, the inviter, and/or other attributes. In other embodiments, the collaboration index can be queried according to various search filters and/or search criteria to determine one or more candidate collaborators.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, references throughout this specification to "some embodiments" or "other embodiments" refers to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A depicts a hierarchical collaboration permissions technique 1A00. As an option, one or more variations of hierarchical collaboration permissions technique 1A00 or any aspect thereof may be implemented in the context of the architecture and functionality of the embodiments described herein. Also, the hierarchical collaboration permissions technique 1A00 or any aspect thereof may be implemented in any environment.

FIG. 1A depicts four representative content objects (e.g., folder A, document B, folder C, and document D) associated in a logical hierarchy in a collaboration view $160_1$. For example, folder A is the parent content object of two children content objects (e.g., document B and folder C), and folder C is the parent content object of one child content object (e.g., document D). In the hierarchical collaboration permissions technique 1A00, a set of parent permissions $162_1$ associated with folder A traverse down (e.g., "waterfall" down) the shown hierarchy to all the children content objects of folder A. Specifically, a set of inherited permissions $164_1$ associated with document B, folder C, and document D will be based on the parent permissions $162_1$ of folder A. As an example, if the parent permissions $162_1$ provisioned access to folder A to user U1, then user U1 will also have access to all other content objects (e.g., document B, folder C, and document D) in the hierarchy.

In such cases, as shown in a collaboration view $160_2$, when user U1 invites user U2 to collaborate on a certain collaboration object (e.g., document B), user U2 will be provisioned access to document B, yet also provisioned access to folder A, folder C, and document D, according to the hierarchical collaboration permissions technique 1A00. As evident by the foregoing example, such techniques fail to address the needed range of collaboration operations over a portion of the content objects associated by a set of parent permissions. Specifically, the request from user U1 to collaborate with user U2 on document B resulted in an updated instance of the parent permissions $162_2$ that in turn produces an updated instance of inherited permissions $164_2$ provisioning access for user U2 to all content objects under the parent permissions $162_2$. The hierarchical collaboration permissions technique 1A00 of FIG. 1A can be augmented through implementation of a user-based collaboration permissions technique as described in FIG. 1B.

FIG. 1B depicts a user-based collaboration permissions technique 1B00 as implemented in systems for managing collaboration of shared content using collaborator indexing. As an option, one or more variations of user-based collaboration permissions technique 1B00 or any aspect thereof may be implemented in the context of the architecture and functionality of the embodiments described herein. Also, the user-based collaboration permissions technique 1B00 or any aspect thereof may be implemented in any environment.

The user-based collaboration permissions technique 1B00 illustrates one embodiment and resulting effect of the implementation of the herein disclosed techniques for managing collaboration of shared content using collaborator indexing. Specifically, the user-based collaboration permissions technique 1B00 depicts four representative content objects (e.g., folder A, document B, folder C, and document D) associated in a logical hierarchy in a collaboration view $170_1$. For example, folder A is the parent content object of two children content objects (e.g., document B and folder C), and folder C is the parent content object of one child content object (e.g., document D). As facilitated by the herein disclosed techniques, the content objects associated by the logical hierarchy (e.g., folder A, document B, folder C, and document D) can each have an independent set of respective permissions (e.g., characterized by permissions attributes $172_1$, permissions attributes $174_1$, permissions attributes $176_1$, and permissions attributes $178_1$, respectively). Specifically, the permission attributes shown in FIG. 1B describe the permissions associated with each user for accessing each content object. For example, permissions attributes $172_1$ indicates user U1 has access to folder A, permissions attributes $174_1$ indicates user U1 has access to document B, permissions attributes $176_1$ indicates user U3 has access to folder C, and permissions attributes $178_1$ indicates user U4 has access to document D. The figure also shows that user U4 has invited user U5 to collaborate on collaboration object D.

Such user-based permissions enable more flexible (e.g., granular) collaboration over other approaches (e.g., the hierarchical collaboration permissions technique 1A00 earlier described). For example, and as shown, in a collaboration view $170_2$, user U1 can invite user U2 to collaborate on document B and user U4 can invite user U5 to collaborate on document D—yet without requiring a permission hierarchy to be imputed or inherited to other objects in the hierarchy up to document A. Specifically, user U2 can be provisioned access to document B in an updated instance of permissions attributes $174_2$ and user U5 can be provisioned access to document D in an updated instance of permissions attributes $178_2$, yet the permissions attributes $172_2$ associated with folder A and the permissions attributes $176_2$ associated with folder C remain unchanged.

In another example case dealing with permissions attributes, and referring to actions/effects between user U1 and user U2 (e.g., see collaboration view $160_2$), when U1 requests to collaborate with U2 on document B, the parent permissions are not changed. In this embodiment, U2 would only be able to view item B. not A, C nor D. Any permission attributes that already existed on document A would flow down to document B, document C, document D. As such, individual items can become shared items—yet without requiring that all permissions in the hierarchy are to be imputed or inherited to other objects in the hierarchy The user-based collaboration permissions technique 1B00 can further enable users to efficiently search for candidate collaborators. For example, the available permissions attributes might be used to traverse up the logical hierarchy to determine that user U3 and user U1 are candidate collaborators for user U5. The permissions attributes might not reveal user U2 as a candidate collaborator for user U5 since user U2 is merely associated with the shown logical hierarchy through a private collaboration with user U1. Candidate collaboration discovery can be based on other search criteria.

While the benefits of the user-based collaboration permissions technique 1B00 are evident, challenges can arise in a cloud-based shared content environment having large numbers of users, collaborations, content objects, and/or permission sets. The herein disclosed techniques address such challenges to facilitate efficiently identifying candidate collaborators and managing collaborations in such a cloud-based shared content environment. One embodiment of a cloud-based environment is described as pertains to FIG. 1C.

FIG. 1C presents a cloud-based environment 1C00, including a cloud-based shared content management platform, for managing collaboration of shared content using collaborator indexing. As an option, one or more variations of cloud-based environment 1C00 or any aspect thereof may be implemented in the context of the architecture and functionality of the embodiments described herein. Also, the cloud-based environment 1C00 or any aspect thereof may be implemented in any environment.

As shown, certain users (e.g., collaborators 121) having various collaboration roles (e.g., user collaborator $123_1$, administrator collaborator $124_1$, creator collaborator $125_1$, etc.) can use one or more instances of user devices 102 to interact with one or more workspaces (e.g., workspace $122_1$, workspace $122_2$, etc.) within the cloud-based environment 1C00. The workspaces can be stored in any location, and are at least partially maintained by components within a cloud-based shared content storage system 101. The cloud-based shared content storage system 101 supports any variety of processing elements and/or storage devices (e.g., a storage filer, a storage facility, etc.) and/or servers such as a host server 115, a sync server 120, a collaboration server 152, an application server 153, a cloud drive server 158, a content server 154, etc.

Any of the users can access shared content from the cloud-based shared content storage system 101 without the additional process of manually downloading and storing a file locally on an instance of the user devices 102 (e.g., smart phone $102_1$, tablet $102_2$, WiFi phone $102_3$, laptop $102_4$, workstation $102_5$, laptop $102_6$, etc.). For example, a content object (e.g., computer file, text document, audio file, video file, image file, etc.) created by the creator collaborator $125_1$ might be viewed by the user collaborator $123_1$, yet without informing the user collaborator $123_1$ where the file is stored, and without prompting the user collaborator $123_1$ for a directory from which to access the file. Such a facility streamlines the frequently repeated sharing and collaboration processes.

Functions and techniques performed by the cloud-based shared content storage system 101 and/or the client side components (e.g., user devices 102, a sync client on an instance of the user devices 102, etc.) are described herein with further details and with reference to several examples.

Figure 1D:
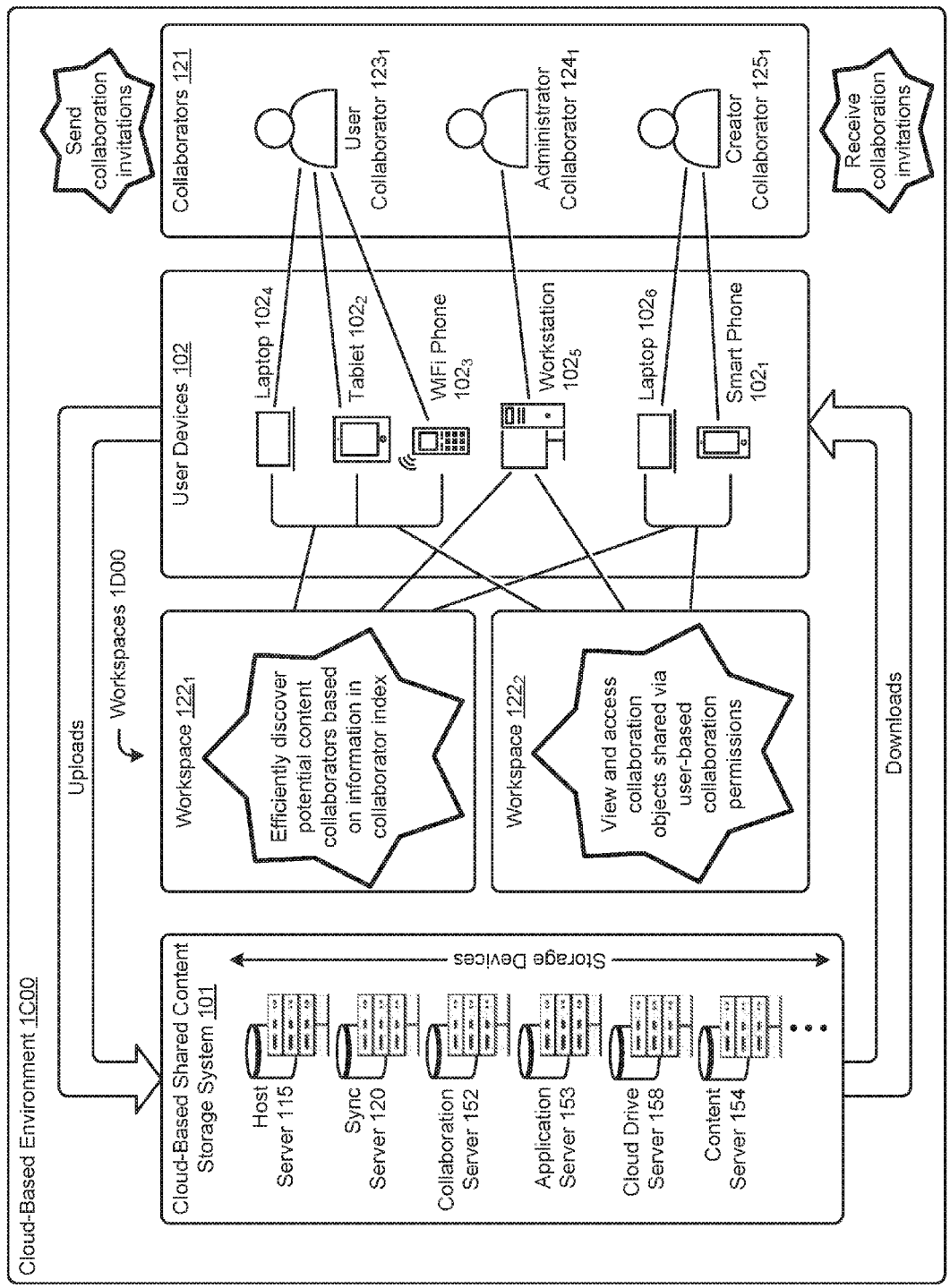
FIG. 1D is a schematic view of populated workspaces that are configured with dynamically-created content that is generated when managing collaboration of shared content using collaborator indexing, according to some embodiments.

FIG. 1D is a schematic view of populated workspaces 1D00 that are configured with dynamically-created content that is generated when managing collaboration of shared content using collaborator indexing. As an option, one or more variations of populated workspaces 1D00 or any aspect thereof may be implemented in the context of the architecture and functionality of the embodiments described herein. Also, the populated workspaces 1D00 or any aspect thereof may be implemented in any environment.

The embodiment shown in FIG. 1D is merely one example implementation of the cloud-based environment 1C00 where two or more of the collaborators 121 (e.g., the user collaborator $123_1$, the administrator collaborator $124_1$, and the creator collaborator $125_1$) share a content object (e.g., computer file, electronic document, image, etc.) and/or a collection (e.g., folder) of content objects, and where each collaborator has a certain access (e.g., for viewing, editing, downloading, etc.) to the shared content object in a respective collaborator-specific workspace (e.g., workspace $122_1$, workspace $122_2$, etc.).

The embodiment shown in FIG. 1D indicates certain operations associated with techniques for managing collaboration of shared content using collaborator indexing. Specifically, a capability to efficiently discover potential content collaborators (e.g., candidate collaborators) based on information in a collaborator index is shown within workspace $122_1$. For example, the creator collaborator $125_1$ might be able to use the collaborator index to search for a set of candidate collaborators that can be invited to collaborate on the content the creator collaborator $125_1$ owns and/or otherwise controls in the workspace $122_1$. The creator collaborator $125_1$ might further be able to invite one or more of the candidate collaborators (e.g., user collaborator $123_1$) to collaborate on certain collaboration objects. Also, a capability to view and access collaboration objects shared via user-based collaboration permissions (e.g., stored in the collaboration index) is shown in workspace $122_2$. For example, the user collaborator $123_1$ (e.g., the invitee) might receive and accept the foregoing collaboration invitation from the creator collaborator $125_1$ (e.g., the inviter) such that the collaboration objects can be accessible in the workspace $122_2$.

Figure 1E:
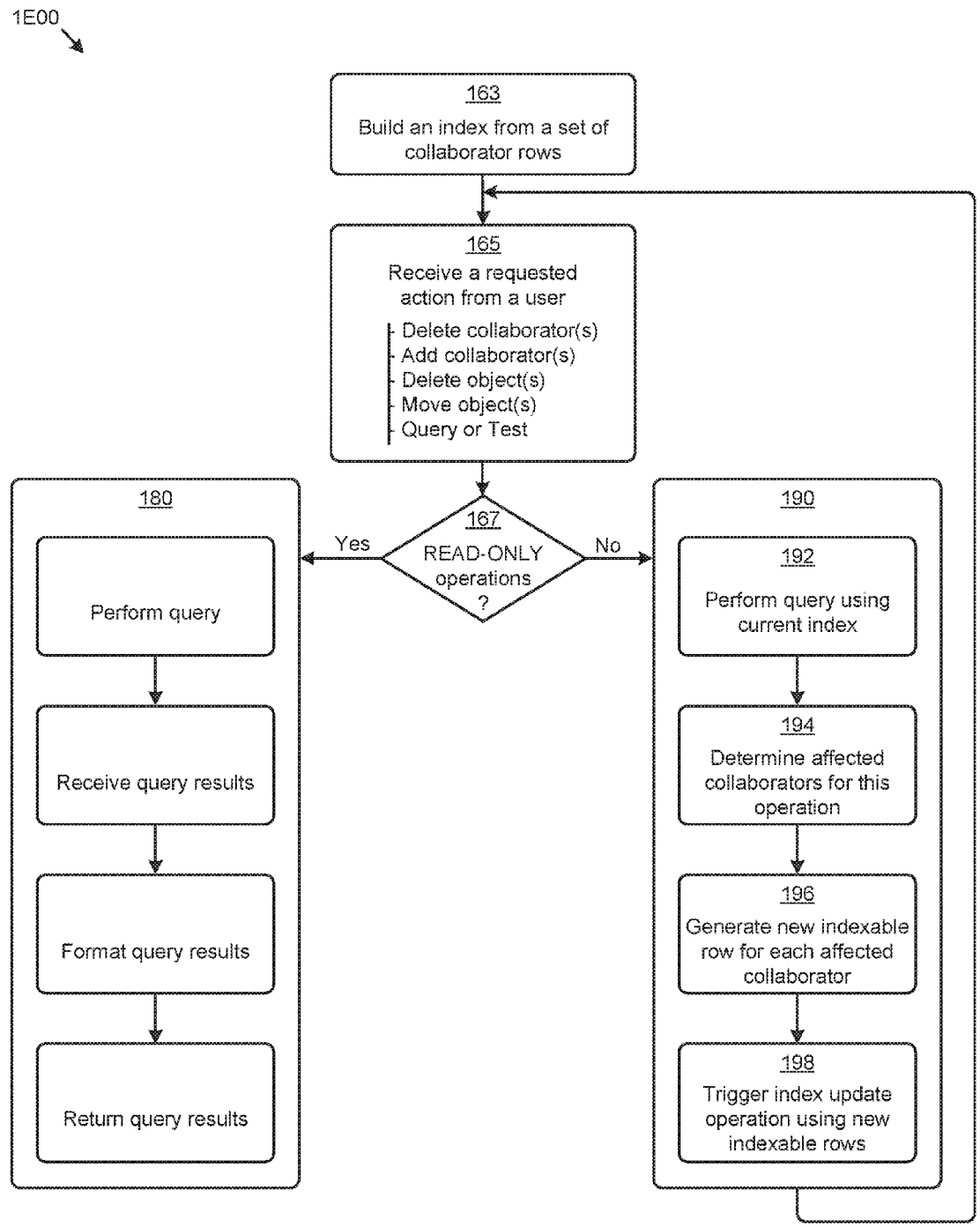
FIG. 1E is a flowchart for managing collaboration of shared content using collaborator indexing, according to some embodiments.

The herein disclosed techniques to implement the scenario described in FIG. 1D is described in the flow of FIG. 1E.

FIG. 1E is a flowchart 1E00 for managing collaboration of shared content using a collaborator index. In many collaboration scenarios, a user would want to see a list of all collaborators over a particular object. To facilitate responsive user operations over a particular object, a collaborator index can be used to efficiently discover potential content collaborators (see FIG. 1D). Construction of such an index is depicted in the flowchart 1E00 as step 163. This collaboration index is used for processing a variety of received user requests. For example, the "YES" branch of decision 167 performs query processing 180. The "No" branch of decision 167 performs maintenance processing 190. A user request can take many forms, such as a request to delete collaborators, a request to add collaborators, a request to delete objects, a request to move objects, or a request to query or test, etc. (see step 165). In the shown cases of performing the maintenance processing 190, the processing results in generation of new index-able rows that capture maintenance changes to the rows for the affected collaborators (see step 196). At the completion of such row generation, steps are taken for triggering an index update operation using the newly generated collaborator rows. The determination of the affected collaborators is performed based on the results of a query over the then-current index (see step 192 and step 194). Strictly as one example, when processing a request to delete a particular object, the collaboration index is consulted (see step 192) to determine the full set of collaborators to that object (see step 194). In this case of deleting the particular object, as many rows as there are collaborators of the particular object are generated. Then, each newly generated row is constructed to indicate the elimination of access to that particular object (e.g., since the object is soon to be deleted). When such rows have been generated, then the maintenance processing 190 triggers an update to the collaboration index (see step 198). Processing returns to again receive a requested action from a user (see step 165). The particular object to be deleted can be deleted or marked for deletion. Deletion can take the form of a deletion of a record in a database and/or in the deletion of the object from a file system, or both.

The herein disclosed techniques enable the scenarios described in FIG. 1D and FIG. 1E by addressing the problems attendant to efficiently identifying candidate collaborators and managing collaborations in a cloud-based shared content environment. One embodiment of a system for implementing the herein disclosed techniques is described in FIG. 2.

Figure 2:
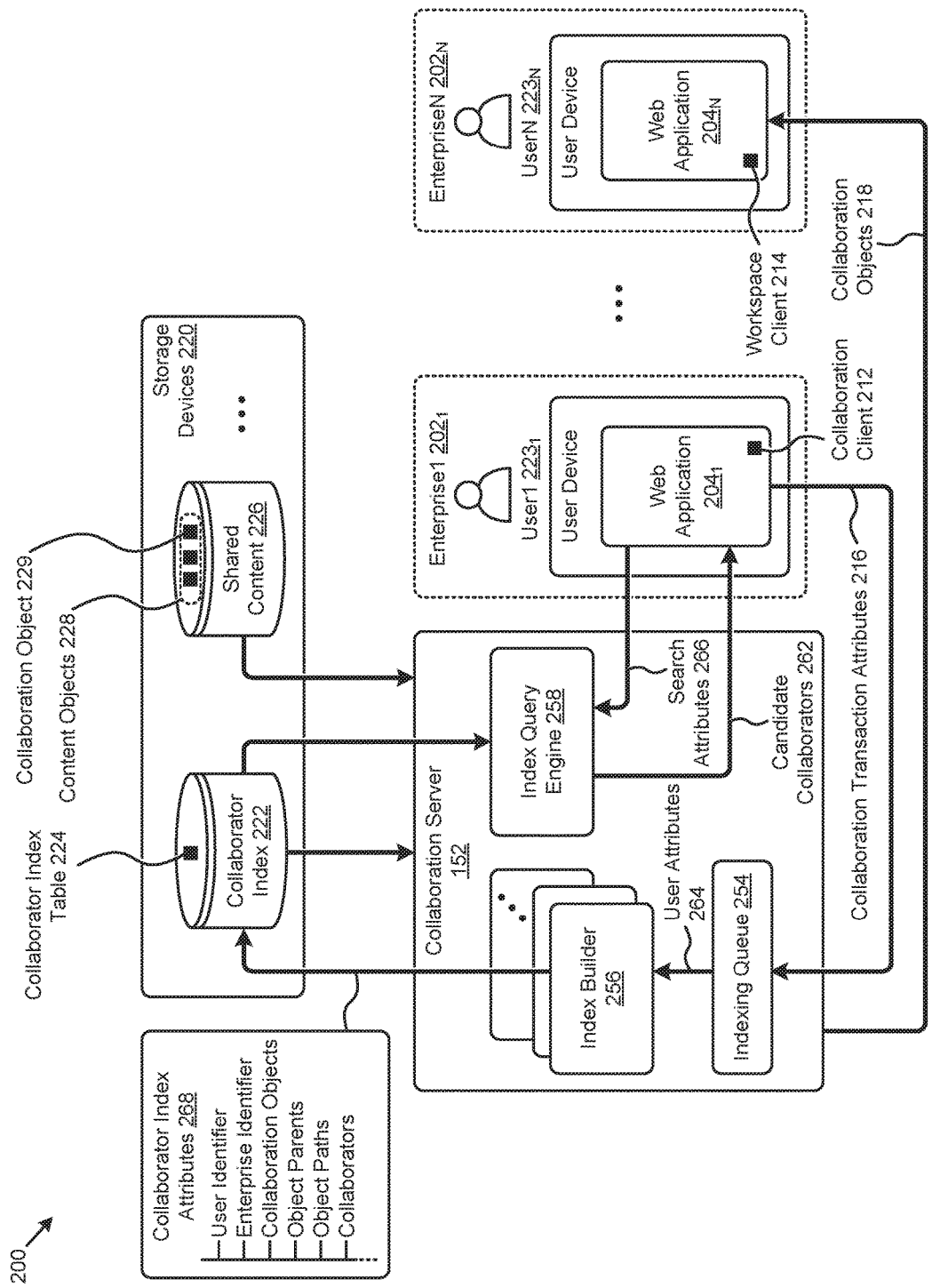
FIG. 2 is a schematic of a system to implement techniques for managing collaboration of shared content using collaborator indexing, according to an embodiment.

FIG. 2 is a schematic of a system 200 to implement techniques for managing collaboration of shared content using collaborator indexing. As an option, one or more variations of system 200 or any aspect thereof may be implemented in the context of the architecture and functionality of the embodiments described herein. Also, the system 200 or any aspect thereof may be implemented in any environment.

The shown data flow depicts multiple users (e.g., user1 $223_1$ from enterprise1 $202_1$, and userN $223_N$ from enterpriseN $202_N$) collaborating on shared content (e.g., shared content 226 from a set of storage devices 220) using the herein disclosed techniques for managing collaboration of shared content using collaborator indexing. Specifically, in one or more embodiments, the collaboration server 152 can facilitate efficiently identifying candidate collaborators and managing collaborations in a cloud-based shared content environment having large numbers of users, collaborations, content objects (e.g., content objects 228), and/or permission sets. Collaboration on a selected instance or selected instances of the content objects 228 in the shared content 226 (e.g., see collaboration object 229) can take place concurrently with other accesses in multiple concurrent sessions involving multiple concurrently sharing users over multiple collaboration objects.

More specifically, in some cases, user1 $223_1$ can use a web application $204_1$ on a user device to search for users available to collaborate on one or more selected collaboration objects from the content objects 228. For example, the web application $204_1$, comprising various functional clients, might be provided by a cloud-based shared content management platform to facilitate use of the herein disclosed techniques. As shown, the user1 $223_1$ might use a collaboration client 212 in the web application $204_1$ to establish a set of search attributes 266 that can be sent to an index query engine 258 operating on the collaboration server 152. For example, the search attributes 266 might specify a certain scope of potential collaborators based on various filters. The index query engine 258 can use the search attributes 266 to query a collaborator index 222 to return a set of candidate collaborators 262 for viewing by the user1 $223_1$. In this case, the user1 $223_1$ can select one or more users from the candidate collaborators 262 to invite to collaborate on the collaboration objects. For example, user1 $223_1$ might want to invite userN $223_N$ to collaborate on the collaboration objects.

When user1 $223_1$ has completed the collaboration transaction (e.g., invited the selected candidate collaborators), a set of collaboration transaction attributes 216 characterizing the collaboration transaction can be sent to an indexing queue 254 operating on the collaboration server 152. For example, the collaboration transaction attributes 216 might include the user identifiers of the invitees invited to collaborate, the user identifier of the inviter (e.g., user1 $223_1$), certain attributes associated with the collaboration objects, and/or other information. The indexing queue 254 can collect (e.g., into a batch, into a group, etc.) a set of user attributes 264 that correspond to the collaboration transaction invoked by user1 $223_1$ and/or other collaboration transactions invoked by other users in the cloud-based environment. Such collections (e.g., batches, groups, etc.) can be sent to a one or more index builders (e.g., index builder 256). The index builders can use the received set of user attributes 264 to generate a set of collaborator index attributes 268 to build an instance of the collaborator index 222. For example, in some embodiments, the collaborator index 222 might be structured as a collaborator index table 224 having rows associated with each user identifier. Specifically, each row might comprise all or a portion of the generated instances of the collaborator index attributes 268. In some embodiments a collaborator index table can be processed by an engine that performs multiple collaboration functions pertaining to indexing (e.g., see index builder 256) and search (e.g., see index query engine).

More specifically, a row might comprise the "user identifier" as the primary key, with other fields (e.g., columns) for "enterprise identifier", "collaboration objects" (e.g., list of file identifiers), "object parents" (e.g., location paths of parents of collaboration objects), "object paths" (e.g., location paths of collaboration objects), "collaborators" (e.g., collaboration inviters), and/or other attributes. When a new instance of the collaborator index 222 is generated (including information associated with the collaboration transaction invoked by user1 $223_1$), the collaboration server 152 can further operate to use the collaborator index 222 to provision access for the invitees (e.g., userN $223_N$) to the selected collaboration objects (e.g., collaboration objects 218). For example, userN $223_N$ might use a workspace client 214 in an instance of the web application $204_N$ to view the collaboration objects 218 selected by user1 $223_1$ for collaboration.

The system 200 of FIG. 2 presents merely one partitioning. The specific example shown is purely exemplary, and other partitioning is reasonable. One embodiment of an environment and protocol supporting such systems, subsystems, and/or partitionings for managing collaboration of shared content using collaborator indexing is shown in FIG. 3.

Figure 3:
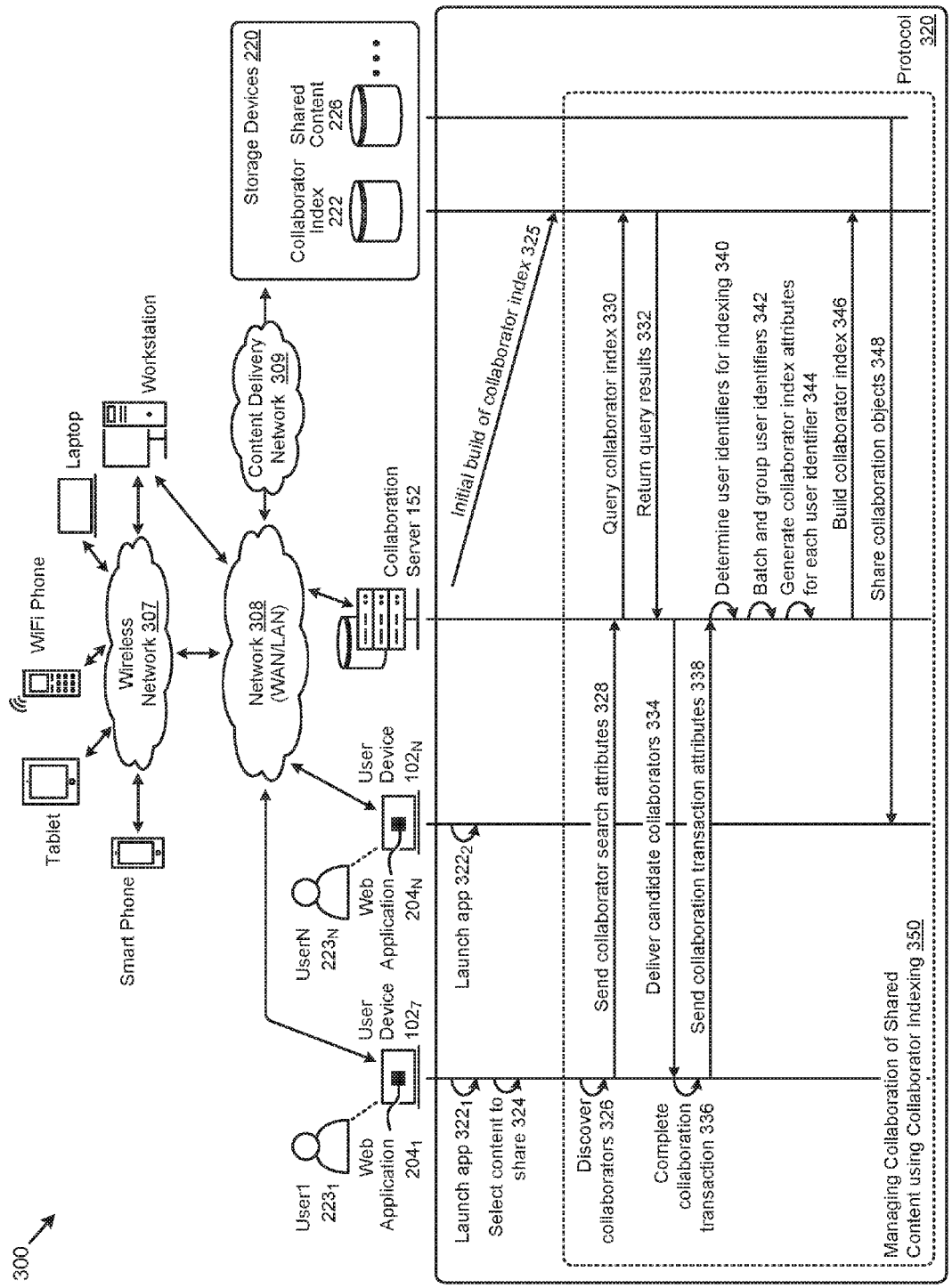
FIG. 3 depicts an environment that can support embodiments of a protocol for managing collaboration of shared content using collaborator indexing, according to an embodiment.

FIG. 3 depicts an environment 300 that can support embodiments of a protocol for managing collaboration of shared content using collaborator indexing. As an option, one or more variations of environment 300 or any aspect thereof may be implemented in the context of the architecture and functionality of the embodiments described herein. Also, the environment 300 or any aspect thereof may be implemented in any environment.

As shown in FIG. 3, the environment 300 comprises various computing systems (e.g., servers and devices) interconnected by a wireless network 307, a network 308, and a content delivery network 309. The wireless network 307, the network 308, and the content delivery network 309 can comprise any combination of a wide area network (e.g., WAN), local area network (e.g., LAN), cellular network, wireless LAN (e.g., WLAN), or any such means for enabling communication of computing systems. The wireless network 307, the network 308, and the content delivery network 309 can also collectively be referred to as the Internet. The content delivery network 309 can comprise any combination of a public network and a private network. More specifically, environment 300 can comprise at least one instance of the earlier described collaboration server 152 and storage devices 220. The servers and storage devices shown in environment 300 can represent any single computing system with dedicated hardware and software, multiple computing systems clustered together (e.g., a server farm, a host farm, etc.), a portion of shared resources on one or more computing systems (e.g., a virtual server), or any combination thereof. For example, the collaboration server 152 and the storage devices 220 can comprise a cloud-based content management platform that provides shared content management and storage services.

The environment 300 further comprises instances of user devices 102 (e.g., user device $102_7$, user device $102_N$) that can represent one of a variety of other computing devices (e.g., a smart phone, a tablet, a WiFi phone, a laptop, a workstation, etc.) having software (e.g., web application $204_1$, web application $204_N$, etc.) and hardware (e.g., a graphics processing unit, display, monitor, etc.) capable of processing and displaying information (e.g., web page, graphical user interface, etc.) on a display. The user devices can further communicate information (e.g., web page request, user activity, electronic files, computer files, etc.) over the wireless network 307, the network 308, and the content delivery network 309. As shown, the user device $102_7$ can be operated by the user1 $223_1$ and the user device $102_N$ can be operated by the userN $223_N$. Also, according to the herein disclosed techniques, the collaborator index 222, the shared content 226, and/or other storage facilities can be included in the storage devices 220.

As shown, the user device $102_7$, the user device $102_N$, the collaboration server 152, and the storage devices 220 can exhibit a set of high-level interactions (e.g., operations, messages, etc.) in a protocol 320. Specifically, and as shown, the web application $204_1$ can be launched at the user device $102_7$ (see operation $322_1$) and the web application $204_N$ can be launched at the user device $102_N$ (see operation $322_2$). Such a web application, for example, might be provided by the cloud-based content management platform to facilitate use of the herein disclosed techniques. For example, user1 $223_1$ might use the web application $204_1$ to select certain content objects (e.g., from the shared content 226) to share with certain collaborators (see operation 324). At some moment in time (e.g., earlier than the moment of entering the protocol 320), a computing resource (e.g., a collaboration server 152) builds an index of collaborators (see asynchronous event 325). Such an index is used in operations that serve for managing collaboration of shared content. Once such set of operations is described as pertains to protocol 320.

As highlighted in the protocol 320, a grouping 350 can represent one embodiment of certain messages and operations used in systems and protocols for managing collaboration of shared content using collaborator indexing. Specifically, such a grouping of interactions might commence with the user1 $223_1$ (e.g., the inviter) using the web application $204_1$ to discover potential collaborators of selected content (see operation 326). The search criteria specified by user1 $223_1$ can be sent as a set of collaborator search attributes to the collaboration server 152 (see message 328). The collaboration server 152 can use the search attributes to query the collaborator index 222 (see message 330). The returned query results (see message 332) can be delivered to user1 $223_1$ as a set of candidate collaborators (see message 334). For example, in some embodiments, the candidate collaborators can be viewed by user1 $223_1$ in the web application $204_1$ in real time as user1 $223_1$ is typing search terms. The user1 $223_1$ can then select certain invitees (e.g., userN $223_N$) from the candidate collaborators and invoke an event (e.g., DOM event, button click, etc.) to complete the collaboration transaction (see operation 336). A set of collaboration attributes associated with the collaboration transaction can be sent to the collaboration server 152 (see message 338). The collaboration server 152 can use the collaboration transaction attributes from user1 $223_1$ and/or other users in the cloud-based environment to determine a set of user identifiers to be included in the next build of the collaborator index 222 (see operation 340). In some cases, the selected user identifiers can be batched and/or grouped for processing (see operation 342). A set of collaborator index attributes associated with each selected user identifier can then be generated (see operation 344). An update of the collaborator index 222 can then be invoked based on the generated collaborator index attributes (see message 346). The new build of the collaborator index 222 can be used (e.g., by the collaboration server 152) to provision access to various users. For example, userN $223_N$ might view certain collaboration objects shared by user1 $223_1$ based on the collaborator index 222 (see message 348).

Further details pertaining to building the collaborator index 222 are described as follows, according to some embodiments.

Figure 4A:
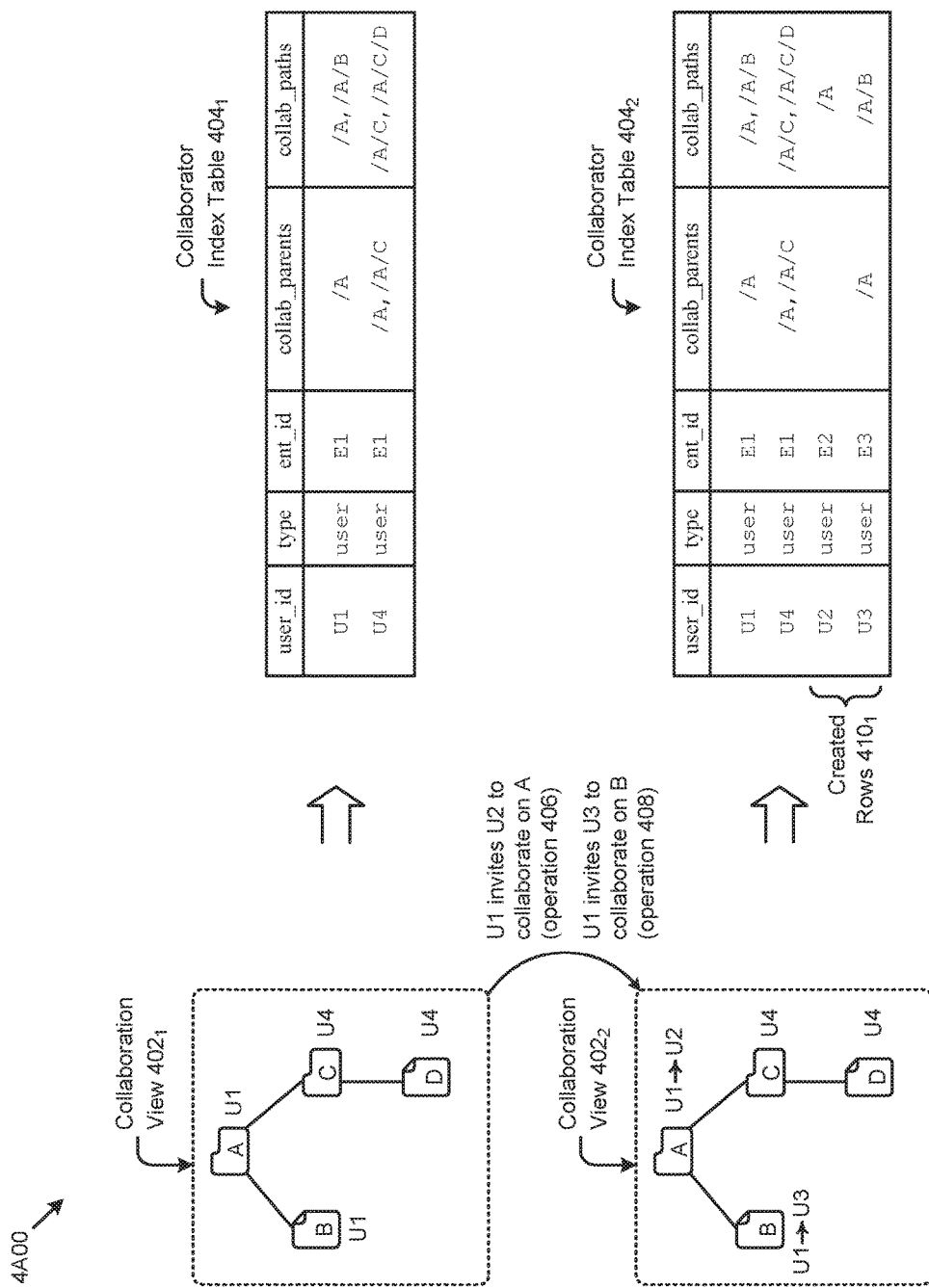
FIG. 4A, FIG. 4B, and FIG. 4C illustrate a sequence of collaborator index build techniques as used in systems for managing collaboration of shared content using collaborator indexing, according to an embodiment.
Figure 4B:
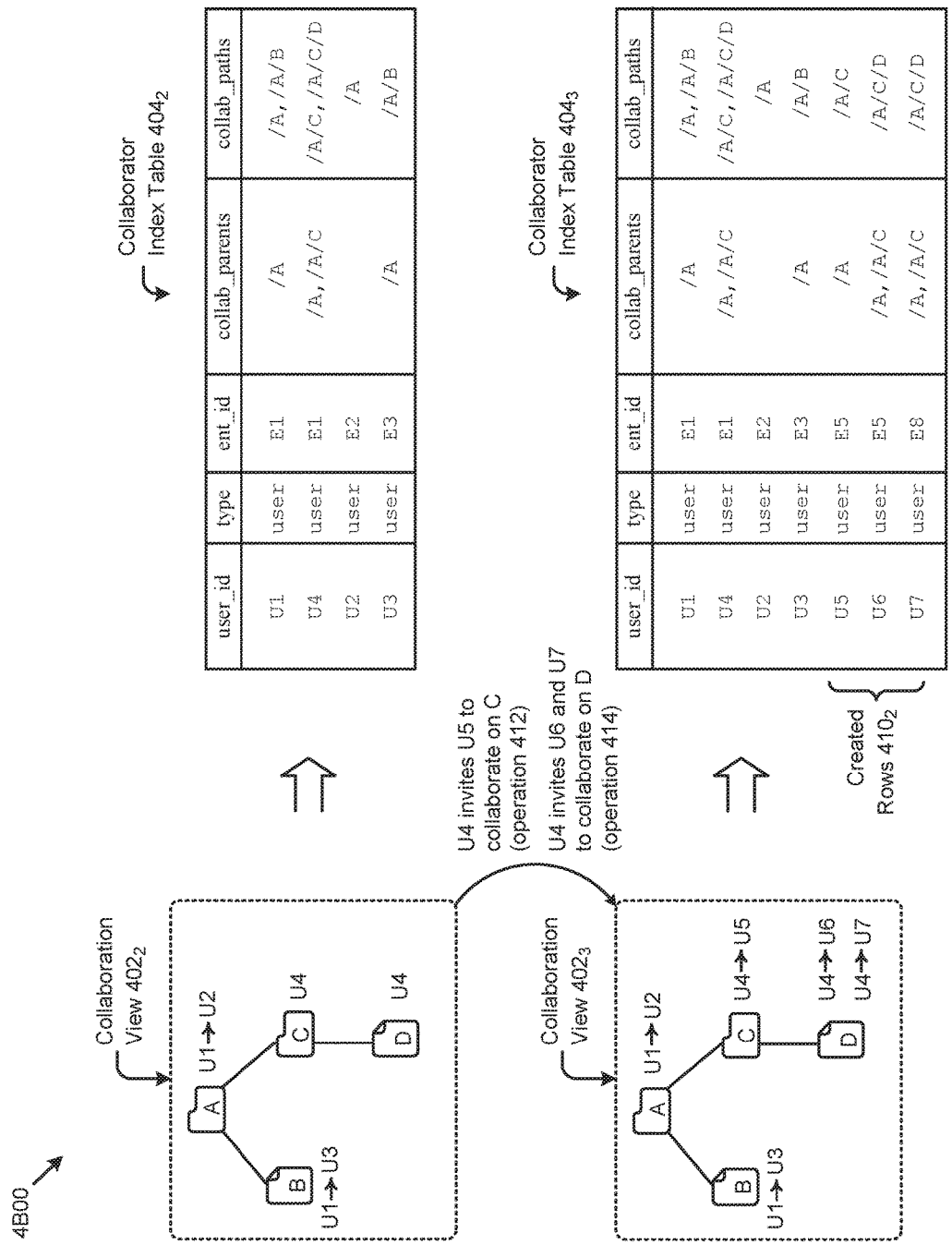
Figure 4C:
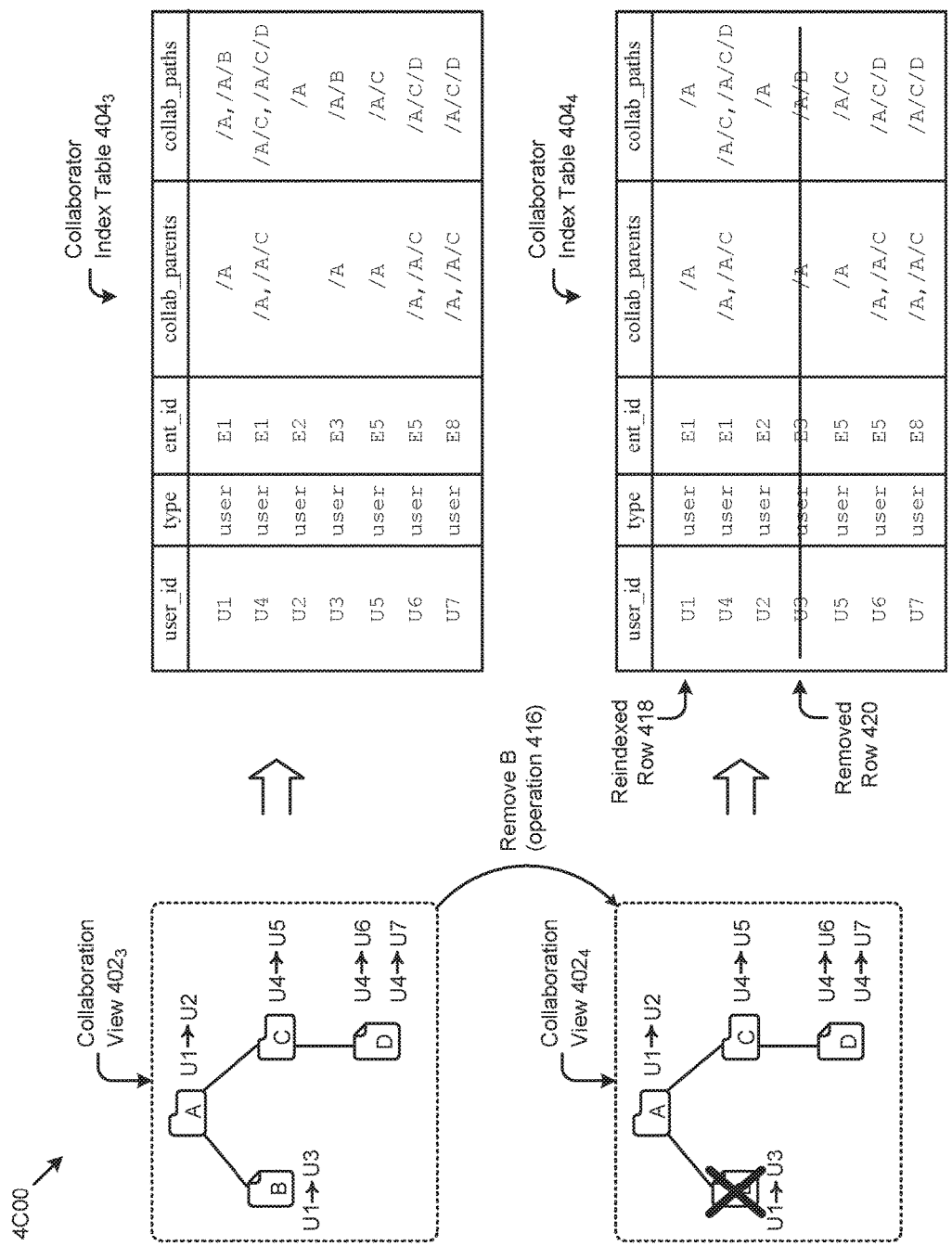

FIG. 4A, FIG. 4B, and FIG. 4C illustrate a sequence of collaborator index build techniques (e.g., collaborator index build technique 4A00, collaborator index build technique 4B00, and collaborator index build technique 4C00, respectively) as used in systems for managing collaboration of shared content using collaborator indexing. As an option, one or more variations of collaborator index build technique 4A00, collaborator index build technique 4B00, or collaborator index build technique 4C00, or any aspect thereof, may be implemented in the context of the architecture and functionality of the embodiments described herein. Also, the collaborator index build technique 4A00, the collaborator index build technique 4B00, or the collaborator index build technique 4C00, or any aspect thereof, may be implemented in any environment.

As shown in FIG. 4A, the collaborator index build technique 4A00 depicts four representative content objects (e.g., folder A, document B, folder C, and document D) associated in a logical hierarchy in a collaboration view $402_1$. As facilitated by the herein disclosed techniques, the content objects associated by the logical hierarchy can each have an independent set of respective permissions. Specifically, and as shown, user U1 has access to folder A, user U1 has access to document B, user U4 has access to folder C, and user U4 has access to document D. According to some embodiments of the herein disclosed techniques, a build of a collaborator index corresponding to the collaboration view $402_1$ can comprise a collaborator index table $404_1$. Specifically, each row of the collaborator index table $404_1$ can correspond to the users comprising the collaboration view $402_1$ and included various collaborator index attributes associated with the user. For example, user U1 has a row indicating user_id=U1, type=user, ent_id=E1, collab_parents=/A, collab_paths=/A, /A/B. Other attributes and/or structures can comprise the collaborator index table $404_1$.

Certain collaboration transactions can invoke a collaboration view $402_2$ and a collaborator index table $404_2$ corresponding to the collaboration view $402_2$. Specifically, U1 might invite U2 to collaborate on folder A (see operation 406), and U1 might invite U3 to collaborate on document B (see operation 408). Such collaboration transactions can trigger a build of the collaborator index comprising the collaborator index table $404_2$. For example, the collaborator index table $404_2$ shows that the rows associated with users U1 and U4 remain unchanged, yet a set of created rows $410_1$ have been appended to the table for invited users U2 and U3.

As shown in FIG. 4B, the collaborator index build technique 4B00 depicts the collaboration view $402_2$ and the collaborator index table $404_2$ from FIG. 4A. As further shown, certain collaboration transactions can invoke a collaboration view $402_3$ and a collaborator index table $404_3$ corresponding to the collaboration view $402_3$. Specifically, U4 might invite U5 to collaborate on folder C (see operation 412), and U4 might invite U6 and U7 to collaborate on document D (see operation 414). Such collaboration transactions can trigger a build of the collaborator index comprising the collaborator index table $404_3$. For example, the collaborator index table $404_3$ shows that the rows associated with users U1, U4, U2, and U3 remain unchanged, yet a set of created rows $410_2$ have been appended to the table for invited users U5, U6, and U7, according to the herein disclosed techniques. Observers of this technique can recognize that the additions of the of created rows $410_2$ that have been appended demands only a modest amount of computing resources, whereas other techniques involving changing rows of collaborators (e.g., the rows associated with users U1, U4, U2, and U3) would require far more computing resources, especially as the number of collaborators increases.

As shown in FIG. 4C, the collaborator index build technique 4C00 depicts the collaboration view $402_3$ and the collaborator index table $404_3$ from FIG. 4B. As further shown, certain collaboration transactions can invoke a collaboration view $402_4$ and a collaborator index table $404_4$ corresponding to the collaboration view $402_4$. Specifically, document B might be removed (see operation 416). Such a collaboration-related transaction can trigger a build of the collaborator index comprising the collaborator index table $404_4$. In this cases, collaborator index information for all users with collaborations related to document B can be impacted. For example, the collaborator index table $404_4$ shows that the index information associated with user U1 might be changed in a reindexed row 418 (e.g., collab_paths=/A/B is removed). Further, the index information for user U3 can be completely removed (e.g., see removed row 420) since document B was the only collaboration object for user U3.

Figure 5:
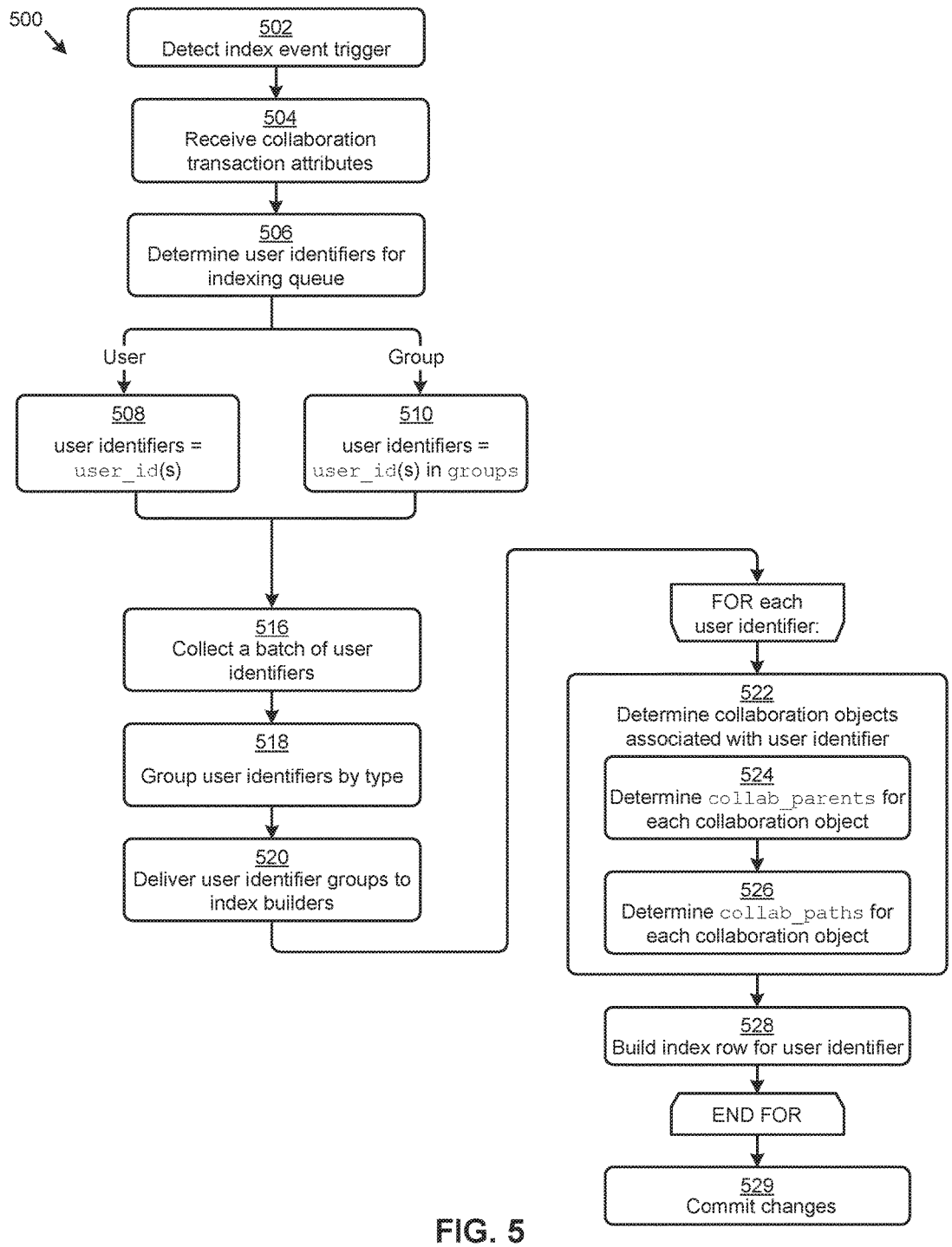
FIG. 5 presents a collaborator index build technique as used in systems for managing collaboration of shared content using collaborator indexing, according to an embodiment.

Further details relating to collaborator index builds according to the herein disclosed techniques is discussed as pertains to FIG. 5.

FIG. 5 presents a collaborator index build technique 500 as used in systems for managing collaboration of shared content using collaborator indexing. As an option, one or more variations of collaborator index build technique 500 or any aspect thereof may be implemented in the context of the architecture and functionality of the embodiments described herein. Also, the collaborator index build technique 500 or any aspect thereof may be implemented in any environment.

The collaborator index build technique 500 presents one embodiment of certain steps for building a collaborator index using the herein disclosed techniques for managing collaboration of shared content using collaborator indexing. In one or more embodiments the steps and underlying operations shown in the collaborator index build technique 500 can be executed by the collaboration server 152 in a cloud-based shared content management platform.

Specifically, the collaborator index build technique 500 can commence with detecting an index event trigger (see step 502). For example, the index event trigger might be issued at the completion of certain collaboration transactions earlier described. Certain collaboration transaction attributes associated with the index event trigger can be received (see step 504) to determine the user identifiers for the collaborator index build that can be delivered to an indexing queue (see step 506). Various collaboration transactions corresponding to users, groups, friends, collaborations, and/or other segments of collaborators can result in certain selections of user identifiers for the collaborator index builds. For example, collaboration transactions related to certain users (e.g., user activation, user deactivation, etc.) might add each user_id corresponding to the collaboration transactions to the queue (see step 508). Collaboration transactions related to certain groups (e.g., group creation, group deletion, user added to group, user removed from group, etc.) might add each user_id in the groups associated with the collaboration transactions to the queue (see step 510).

The selected user identifiers corresponding to the collaboration transactions can further be batched (see step 516) and/or grouped by type such as by user, by group, by friend, etc. (see step 518). For example, such batches or groups can be composed to maximize the efficiency of later processing when delivered to the index builders (see step 520). Specifically, the index builders might comprise respective computing resources (e.g., servers, server partitions, etc.) in a distributed computing system configured to process a user identifier group comprising certain types of user identifiers (e.g., all user identifiers in enterpriseN, all user identifiers in locationX, etc.).

As shown, for each user identifier in the user identifier groups received at the index builders, the following operations can be performed. The collaboration objects associated with the user identifier can be determined (see step 522). In some embodiments, such collaboration objects can be identified from the received collaboration transaction attributes and/or from a current build of the collaboration index. In other embodiments, such collaboration objects can be identified from a collaboration database. The collab_parents for each identified collaboration object can then be determined (see step 524). Further, the collab_paths for each identified collaboration object can be determined (see step 526). A collaborator index row for the user identifier comprising the foregoing attributes (e.g., collab_parents, collab_paths) and/or other attributes can be included in a new build of the collaborator index (see step 528). When the iterations complete, the collaborator index rows that were generated in the iterations can be committed (see step 529). The set of collaborator index rows that were generated can be sent to the indexer as a batch, which in turn can be processed, possibly following other batches that have been queued to the index builder (e.g., see indexing queue 254). As heretofore mentioned, very large sets of collaboration objects and/or very large sets of users can be managed efficiently inasmuch as each triggering of re-indexing operations needs to process only the added rows. The added rows reflect changes pertaining to the collaborators of the subject item (e.g., the inviter and the invitees). The number of added rows to be re-indexed is commonly a much smaller number of rows than the total number of pre-existing rows.

Continuing this description, the collaborator index built according to the foregoing collaborator index build techniques as disclosed herein can further facilitate efficiently identifying candidate collaborators in a cloud-based shared content environment having large numbers of users, collaborations, content objects, and/or permission sets. One embodiment of a collaborator index querying technique for identifying candidate collaborators and/or performing other operations is described in FIG. 6.

Figure 6:
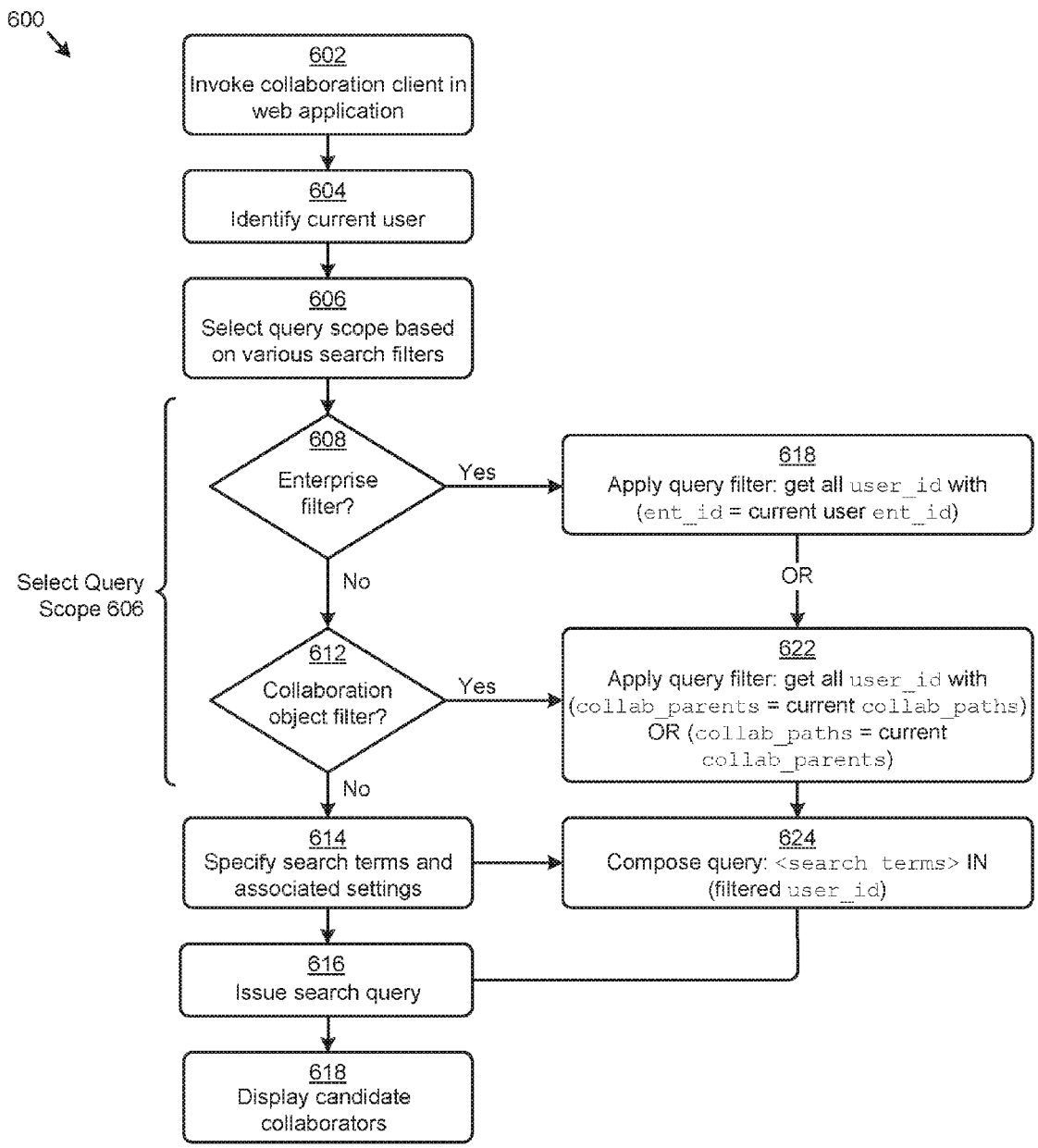
FIG. 6 presents a collaborator index query technique as used in systems for managing collaboration of shared content using collaborator indexing, according to an embodiment.

FIG. 6 presents a collaborator index query technique 600 as used in systems for managing collaboration of shared content using collaborator indexing. As an option, one or more variations of collaborator index query technique 600 or any aspect thereof may be implemented in the context of the architecture and functionality of the embodiments described herein. Also, the collaborator index query technique 600 or any aspect thereof may be implemented in any environment.

The collaborator index query technique 600 presents one embodiment of certain steps for querying a collaborator index for candidate collaborators. In one or more embodiments the steps and underlying operations shown in the collaborator index query technique 600 can be executed by the collaboration server 152 in a cloud-based shared content management platform. In some cases, defaults are automatically selected, and the user need not use the shown user interface. In some cases a user (e.g., current user) can invoke a collaboration client from a web application that operates in a browser on a user device (see step 602). The collaborator index query technique 600 can further identify the current user to facilitate other operations (see step 604). For example, the user_id and/or ent_id of the current user might be used to filter certain query results. A query scope might then be selected (e.g., by the user, or automatically by the system) based on various search filters (see grouping 606). Such search filters and/or other search criteria might be automatically determined (e.g., by the collaboration client) based on the current user user_id, and/or specified by the current user (e.g., in the web application). In some cases, the search filters and/or search criteria might be based on pre-existing permissions for the users (e.g., all users in a given enterprise can collaborate). For example, and as shown, the collaborator index query technique 600 might determine whether an enterprise filter is selected such that the search might be limited to cover users who are in the same enterprise of the current user (see decision 608). If yes, a query filter (see step 618) might be applied to get all user_id with (ent_id=current user ent_id). Further, the collaborator index query technique 600 might determine whether a collaboration object filter is selected (see decision 612) such that the search might be limited to users collaborating on a particular collaboration object and/or content objects associated with the collaboration object (e.g., parent folders, child folders, etc.). If yes, a query filter (see step 622) might be applied to get all user_id with (collab_parents=current collab_paths) OR (collab_paths=current collab_parents). Other filters are possible.

Certain search terms (e.g., "John", "Engineering", etc.) and/or other associated settings might further be specified (see step 614) to be used in composing a candidate collaborator search query (see step 624). For example, the query might search for user_ids with attributes matching the specified search terms from the pool of user_ids established by the enabled instances of the foregoing filters and/or other filters (e.g., the logical OR of the enabled filters). The composed query can then be issued (see step 616) to return a set of candidate collaborators for display to the user (see step 618).

Figure 7:
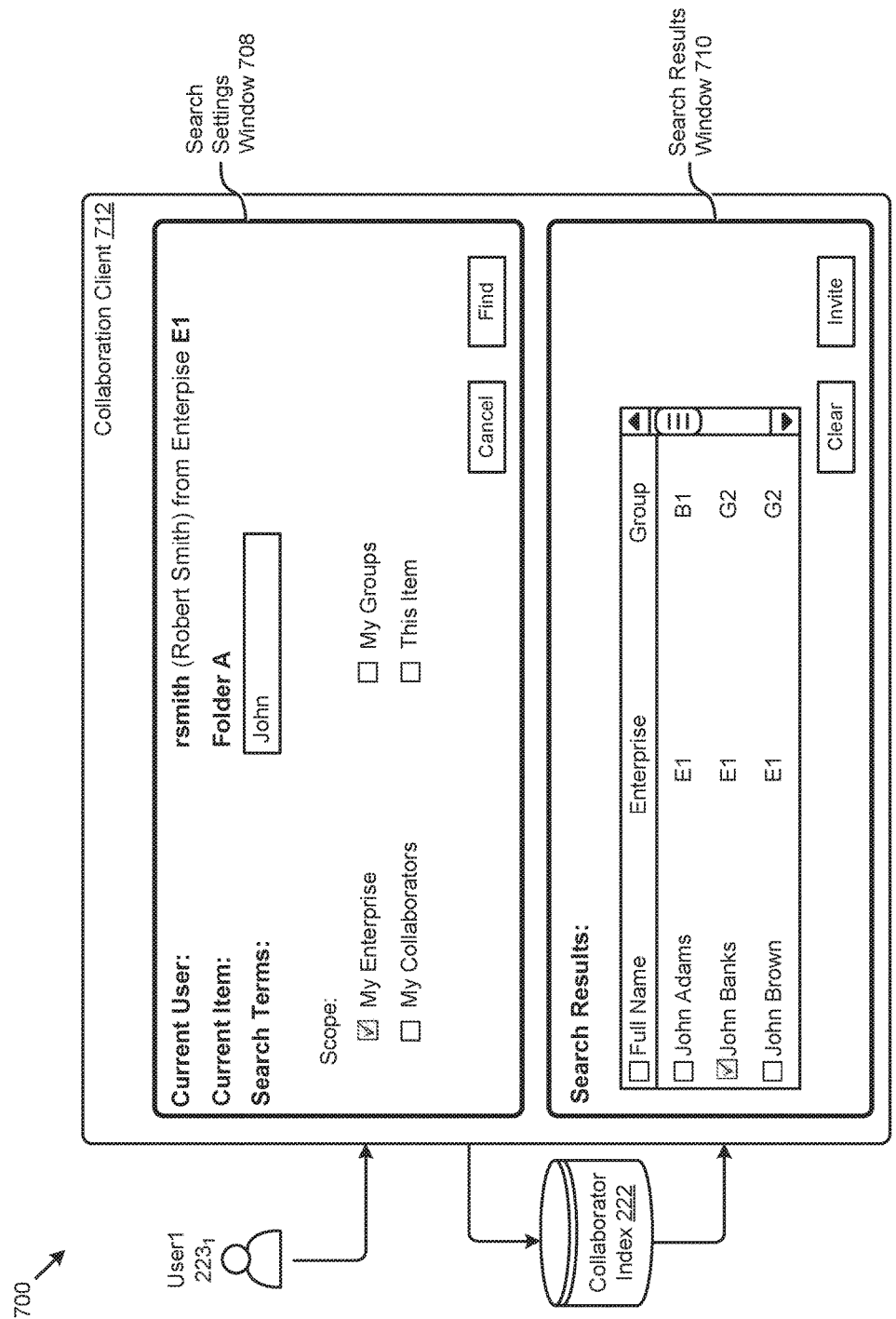
FIG. 7 depicts a collaboration space management interface as used in systems for managing collaboration of shared content using collaborator indexing, according to an embodiment.

One embodiment of a user interface to enable a user to select at least a portion of the search filters and/or search criteria related to the collaborator index query technique 600 is shown in FIG. 7.

FIG. 7 depicts a collaboration space management interface 700 as used in systems for managing collaboration of shared content using collaborator indexing. As an option, one or more variations of collaboration space management interface 700 or any aspect thereof may be implemented in the context of the architecture and functionality of the embodiments described herein. Also, the collaboration space management interface 700 or any aspect thereof may be implemented in any environment.

In one or more embodiments, the collaboration space management interface 700 can enable a user (e.g., user1 $223_1$) to specify certain attributes pertaining to a candidate collaborator search facilitated by systems for managing collaboration of shared content using collaborator indexing. The collaboration space management interface 700 can further enable the user to select one or more candidate collaborators to be invited to collaborate on certain collaboration objects. Specifically, and as shown, user1 $223_1$ might invoke a collaboration client 712 (e.g., in a web application) comprising a search settings window 708 and a search results window 710. The search settings window 708 might show certain attributes pertaining to the current user (e.g., user1 $223_1$) such as username (e.g., "rsmith"), user full name (e.g., "Robert Smith"), enterprise (e.g., "E1"), and/or other attributes. A current item selected for collaboration (e.g., "Folder A") might also be displayed. In some cases, the collaboration object might be selected from another client window (e.g., from a workspace client). Multiple collaboration objects can be selected for collaboration. The search settings window 708 can further enable user1 $223_1$ to specify certain search terms (e.g., "John"), select various search filters (e.g., "My enterprise", "My Groups", "My Collaborators", "This item", etc.), and/or specify other search attributes. When the search criteria have been established in the search settings window 708, the user1 $223_1$ can invoke the search on the collaborator index 222 (e.g., by clicking the "Find" button).

The results of the search on the collaborator index 222 can be displayed in the search results window 710. Specifically, the results show users from enterprise "E1" (e.g., the same enterprise as the current user) that best match the search term "John". In some embodiments, the search results shown in the search results window 710 might be displayed in real time (e.g., without clicking the "Find" button) as attributes are specified in the search settings window 708. As shown, user1 $223_1$ might select "John Banks" to invite (e.g., by clicking the "Invite" button) to collaborate on the current item.

Additional Embodiments of the Disclosure

Additional Practical Application Examples

Figure 8A:
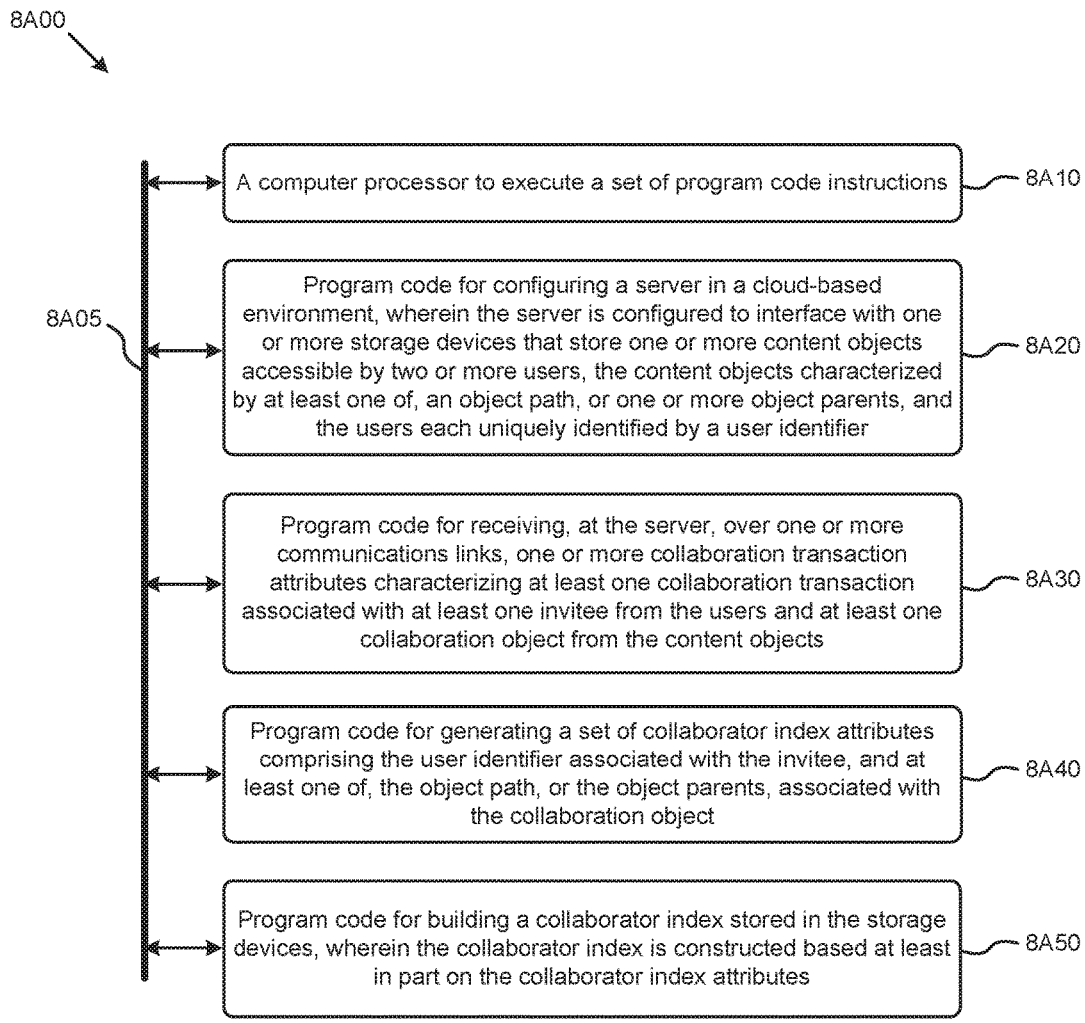
FIG. 8A and FIG. 8B depict system components as arrangements of computing modules that are interconnected so as to implement certain of the herein-disclosed embodiments.

FIG. 8A depicts a system 8A00 as an arrangement of computing modules that are interconnected so as to operate cooperatively to implement certain of the herein-disclosed embodiments. The partitioning of system 8A00 is merely illustrative and other partitions are possible. As an option, the system 8A00 may be implemented in the context of the architecture and functionality of the embodiments described herein. Of course, however, the system 8A00 or any operation therein may be carried out in any desired environment.

The system 8A00 comprises at least one processor and at least one memory, the memory serving to store program instructions corresponding to the operations of the system. As shown, an operation can be implemented in whole or in part using program instructions accessible by a module. The modules are connected to a communication path 8A05, and any operation can communicate with other operations over communication path 8A05. The modules of the system can, individually or in combination, perform method operations within system 8A00. Any operations performed within system 8A00 may be performed in any order unless as may be specified in the claims.

The shown embodiment implements a portion of a computer system, presented as system 8A00, comprising a computer processor to execute a set of program code instructions (see module 8A10) and modules for accessing memory to hold program code instructions to perform: configuring a server in a cloud-based environment, wherein the server is configured to interface with one or more storage devices that store one or more content objects accessible by two or more users, the content objects characterized by at least one of, an object path, or one or more object parents, and the users each uniquely identified by a user identifier (see module 8A20); receiving, at the server (e.g., over one or more communications links), one or more collaboration transaction attributes characterizing at least one collaboration transaction associated with at least one invitee from the users and at least one collaboration object from the content objects (see module 8A30); generating a set of collaborator index attributes comprising the user identifier associated with the invitee, and at least one of, the object path, or the object parents, associated with the collaboration object (see module 8A40); and building a collaborator index stored in the storage devices, wherein the collaborator index is constructed based at least in part on the collaborator index attributes (see module 8A50).

Figure 8B:
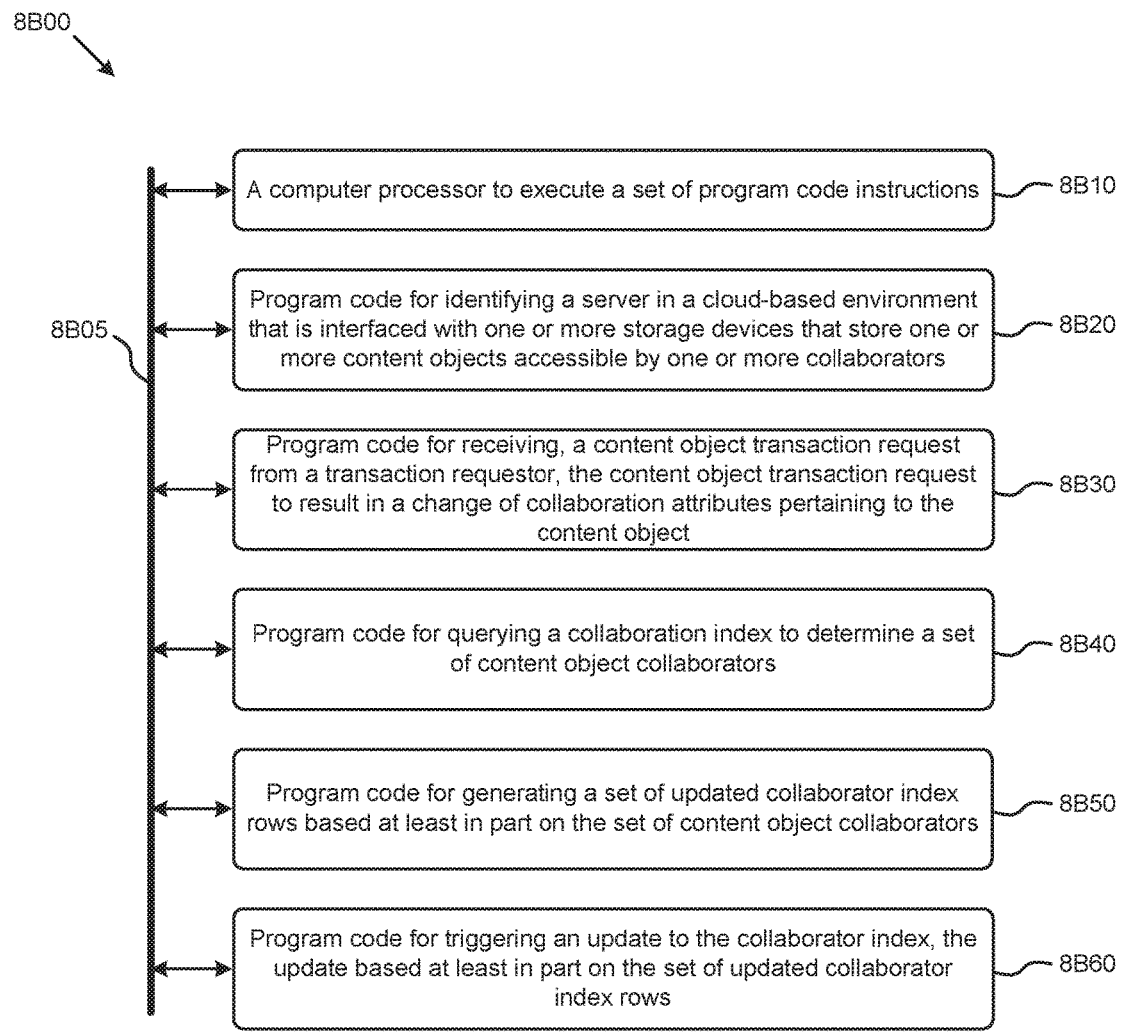

FIG. 8B depicts a system 8B00 as an arrangement of computing modules that are interconnected so as to operate cooperatively to implement certain of the herein-disclosed embodiments. The partitioning of system 8B00 is merely illustrative and other partitions are possible. As an option, the system 8B00 may be implemented in the context of the architecture and functionality of the embodiments described herein. Of course, however, the system 8B00 or any operation therein may be carried out in any desired environment. The system 8B00 comprises at least one processor and at least one memory, the memory serving to store program instructions corresponding to the operations of the system. As shown, an operation can be implemented in whole or in part using program instructions accessible by a module. The modules are connected to a communication path 8B05, and any operation can communicate with other operations over communication path 8B05. The modules of the system can, individually or in combination, perform method operations within system 8B00. Any operations performed within system 8B00 may be performed in any order unless as may be specified in the claims. The shown embodiment implements a portion of a computer system, presented as system 8B00, comprising a computer processor to execute a set of program code instructions (see module 8B10) and modules for accessing memory to hold program code instructions to perform: identifying a server in a cloud-based environment that is interfaced with one or more storage devices that store one or more content objects accessible by one or more collaborators (see module 8B20); receiving, a content object transaction request from a transaction requestor, the content object transaction request to result in a change of collaboration attributes pertaining to the content object (see module 8B30); querying a collaboration index to determine a set of content object collaborators (see module 8B40); generating a set of updated collaborator index rows based at least in part on the set of content object collaborators (see module 8B50); and triggering an update to the collaborator index, the update based at least in part on the set of updated collaborator index rows (see module 8B60).

System Architecture Overview

Additional System Architecture Examples

Figure 9A:
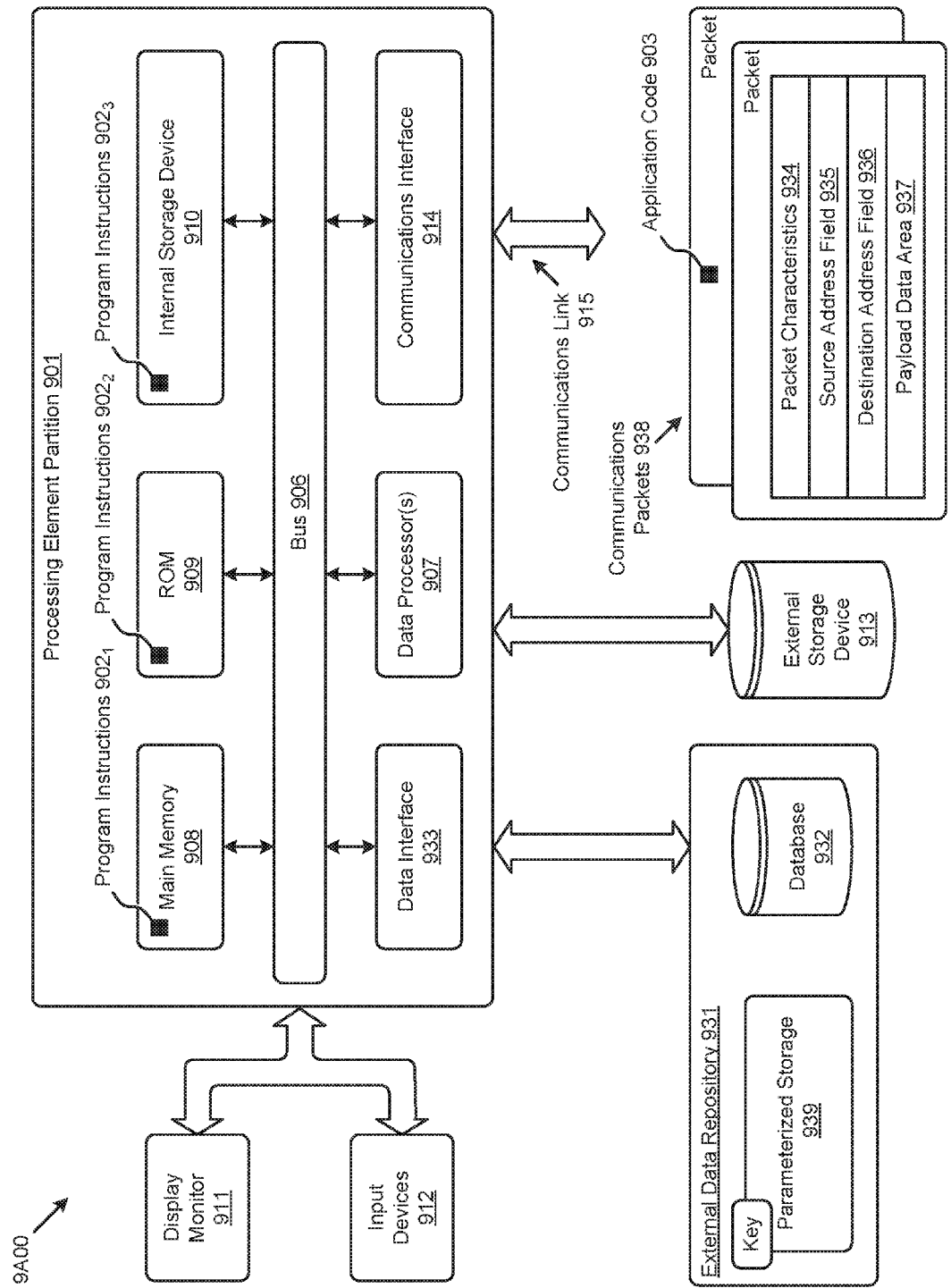
FIG. 9A and FIG. 9B present block diagrams of computer system architectures having components suitable for implementing embodiments of the present disclosure, and/or for use in the herein-described environments.

FIG. 9A depicts a block diagram of an instance of a computer system 9A00 suitable for implementing embodiments of the present disclosure. Computer system 9A00 includes a bus 906 or other communication mechanism for communicating information. The bus interconnects subsystems and devices such as a central processing unit (CPU), or a multi-core CPU (e.g., data processor 907), a system memory (e.g., main memory 908, or an area of random access memory (RAM)), a non-volatile storage device or non-volatile storage area (e.g., read-only memory 909), an internal storage device 910 or external storage device 913 (e.g., magnetic or optical), a data interface 933, a communications interface 914 (e.g., PHY, MAC, Ethernet interface, modem, etc.). The aforementioned components are shown within processing element partition 901, however other partitions are possible. The shown computer system 9A00 further comprises a display 911 (e.g., CRT or LCD), various input devices 912 (e.g., keyboard, cursor control), and an external data repository 931.

According to an embodiment of the disclosure, computer system 9A00 performs specific operations by data processor 907 executing one or more sequences of one or more program code instructions contained in a memory. Such instructions (e.g., program instructions $902_1$, program instructions $902_2$, program instructions $902_3$, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 9A00 performs specific networking operations using one or more instances of communications interface 914. Instances of the communications interface 914 may comprise one or more networking ports that are configurable (e.g., pertaining to speed, protocol, physical layer characteristics, media access characteristics, etc.) and any particular instance of the communications interface 914 or port thereto can be configured differently from any other particular instance. Portions of a communication protocol can be carried out in whole or in part by any instance of the communications interface 914, and data (e.g., packets, data structures, bit fields, etc.) can be positioned in storage locations within communications interface 914, or within system memory, and such data can be accessed (e.g., using random access addressing, or using direct memory access DMA, etc.) by devices such as data processor 907.

The communications link 915 can be configured to transmit (e.g., send, receive, signal, etc.) any types of communications packets 938 comprising any organization of data items. The data items can comprise a payload data area 937, a destination address 936 (e.g., a destination IP address), a source address 935 (e.g., a source IP address), and can include various encodings or formatting of bit fields to populate the shown packet characteristics 934. In some cases the packet characteristics include a version identifier, a packet or payload length, a traffic class, a flow label, etc. In some cases the payload data area 937 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 907 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 931, which in turn can be formatted into any one or more storage areas, and which can comprise parameterized storage 939 accessible by a key (e.g., filename, table name, block address, offset address, etc.).

Execution of the sequences of instructions to practice certain embodiments of the disclosure are performed by a single instance of the computer system 9A00. According to certain embodiments of the disclosure, two or more instances of computer system 9A00 coupled by a communications link 915 (e.g., LAN, PTSN, or wireless network) may perform the sequence of instructions required to practice embodiments of the disclosure using two or more instances of components of computer system 9A00.

The computer system 9A00 may transmit and receive messages such as data and/or instructions organized into a data structure (e.g., communications packets). The data structure can include program instructions (e.g., application code 903), communicated through communications link 915 and communications interface 914. Received program code may be executed by data processor 907 as it is received and/or stored in the shown storage device or in or upon any other non-volatile storage for later execution. Computer system 9A00 may communicate through a data interface 933 to a database 932 on an external data repository 931. Data items in a database can be accessed using a primary key (e.g., a relational database primary key).

The processing element partition 901 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 907. Some embodiments include one or more special-purpose hardware components (e.g., power control, logic, sensors, transducers, etc.). A module may include one or more state machines and/or combinational logic used to implement or facilitate the operational and/or performance characteristics associated with techniques for managing collaboration of shared content using collaborator indexing.

Various implementations of the database 932 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of managing collaboration of shared content using collaborator indexing). Such files or records can be brought into and/or stored in volatile or non-volatile memory.

Figure 9B:
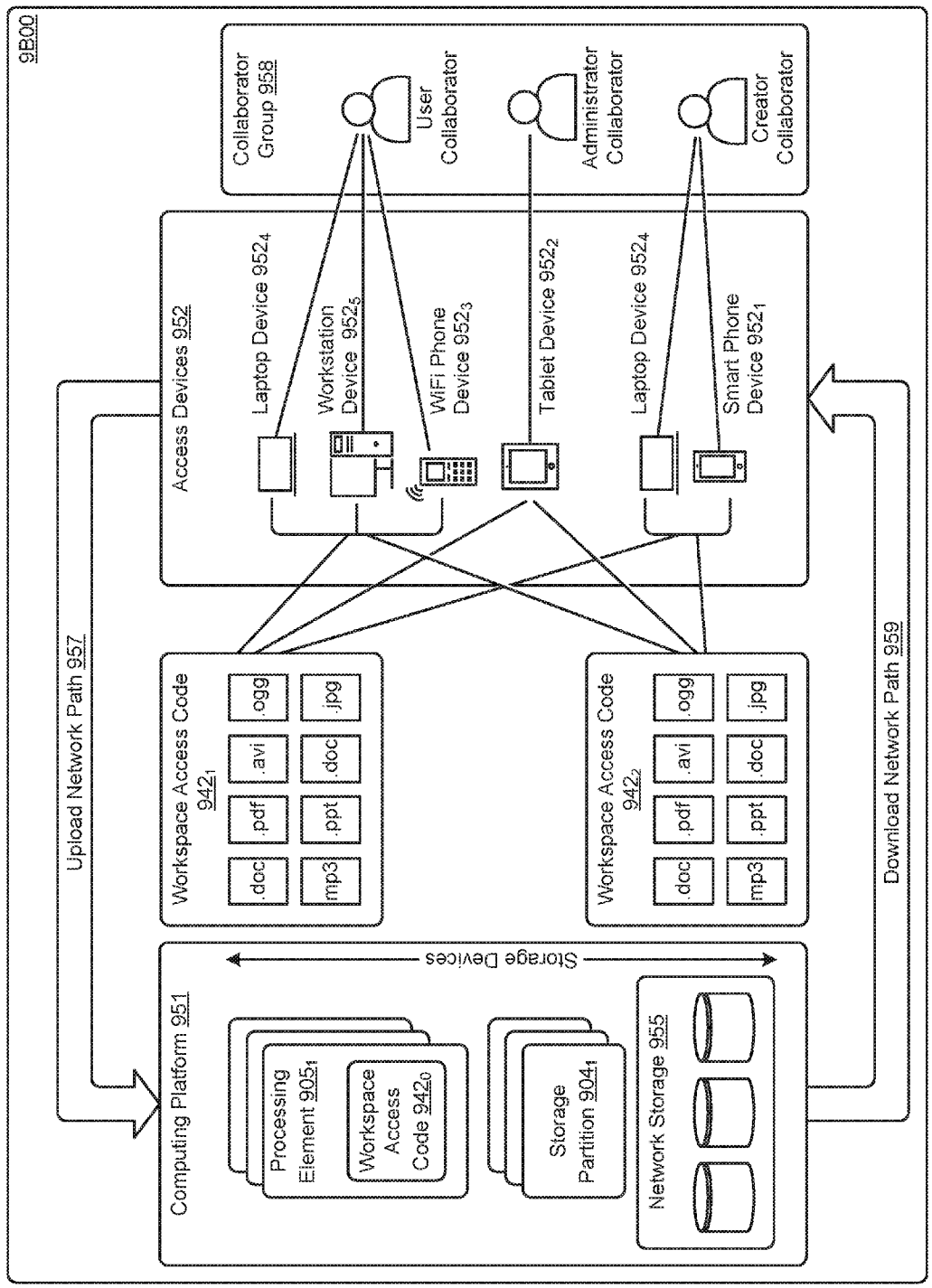

FIG. 9B depicts a block diagram of an instance of a cloud-based environment 9B00. Such a cloud-based environment supports access to workspaces through the execution of workspace access code (e.g., workspace access code 942$_0$, workspace access code 942$_1$, and workspace access code 942$_2$) Workspace access code can be executed on any of the shown access devices 952 (e.g., laptop device 952$_4$, workstation device 952$_5$, IP phone device 952$_3$, tablet device 952$_2$, smart phone device 952$_1$, etc.). A group of users can form a collaborator group 958, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Also, a portion of the workspace access code can reside in and be executed on any computing platform 951, including in a middleware setting. As shown, a portion of the workspace access code resides in and can be executed on one or more processing elements (e.g., processing element 905$_1$). The workspace access code can interface with storage devices such the shown networked storage 955. Storage of workspaces and/or any constituent files or objects, and/or any other code or scripts or data can be stored in any one or more storage partitions (e.g., storage partition 904$_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 957). A stored workspace can be delivered to a particular user and/or shared with other particular users via a download (e.g., a download from a processing element to an access device over a download network path 959).

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings to be regarded in an illustrative sense rather than in a restrictive sense.

What is claimed is:

1. A method comprising:
   identifying a server in a cloud-based environment that is interfaced with one or more storage devices that store one or more content objects accessible by one or more collaborators;
   receiving a content object transaction request from a transaction requestor, the content object transaction request to result in a change of collaboration attributes pertaining to the content object;
   maintaining a collaboration index as a database table, the database table comprising:
      (i) a first column that identifies an object path associated with the content object,
      (ii) a second column that identifies an object parent associated with the content object,
      (iii) a third column that identifies user identifiers associated with the one or more collaborators; and
      (iv) one or more database rows associated with the user identifiers from the third column, wherein a user is designated as a collaborator for the content object by inserting a database row for the user identified from the third column into the one or more database rows of the database table where the object path in the first column for the database row corresponds to the content object and one or more object parents for the content object associated with the user is included in the second column;
   querying the database table to determine a set of potential content object collaborators for a current object by identifying the user identifiers from the third column from among the one or more database rows that are identified as having a current content object path or having a current content object parent path listed in at least one of the first column or the second column;
   generating one or more updated database rows in the database table based at least in part on the set of content object collaborators; and
   triggering an update to the collaborator index based at least in part on the one or more updated database rows.

2. The method of claim 1, wherein the content object transaction request is one of, a delete collaborator request, or an add collaborator request, or a delete object request, or a move object request.

3. The method of claim 1, wherein the updated database rows comprise at least some of, a user identifier associated with the requestor, or one or more user identifiers associated with the content object collaborators, or an object path associated with the content object, or an object parent associated with the content object.

4. The method of claim 3, wherein the collaborators are determined based on one or more search attributes, the search attributes comprising at least one of, one or more search terms, or an enterprise filter, or any combination thereto.

5. The method of claim 3, further comprising delivering a web application for operation on at least one user device to facilitate selection of at least one content object to determine a set of candidate collaborators.

6. The method of claim 5, wherein the candidate collaborators are displayed in the web application.

7. The method of claim 1, wherein the collaborator index is a table.

8. A computer program product, embodied in a non-transitory computer readable medium, the non-transitory computer readable medium having stored thereon a sequence of instructions which, when stored in memory and executed by a processor causes the processor to perform a set of acts, the acts comprising:
   identifying a server in a cloud-based environment that is interfaced with one or more storage devices that store one or more content objects accessible by one or more collaborators;
   receiving a content object transaction request from a transaction requestor, the content object transaction request to result in a change of collaboration attributes pertaining to the content object;
   maintaining a collaboration index as a database table, the database table comprising:
      (i) a first column that identifies an object path associated with the content object,
      (ii) a second column that identifies an object parent associated with the content object,
      (iii) a third column that identifies user identifiers associated with the one or more collaborators; and
      (iv) one or more database rows associated with the user identifiers from the third column, wherein a user is designated as a collaborator for the content object by inserting a database row for the user identified from the third column into the one or more database rows of the database table where the object path in the first column for the database row corresponds to the content object and one or more object parents for the content object associated with the user is included in the second column;
   querying the database table to determine a set of potential content object collaborators for a current object by identifying the user identifiers from the third column from among the one or more database rows that are identified as having a current content object path or having a current content object parent path listed in at least one of the first column or the second column;
   generating one or more updated database rows in the database table based at least in part on the set of content object collaborators; and
   triggering an update to the collaborator index based at least in part on the one or more updated database rows.

9. The computer program product of claim 8, wherein the content object transaction request is one of, a delete collaborator request, or an add collaborator request, or a delete object request, or a move object request.

10. The computer program product of claim 8, wherein the updated database rows comprise at least some of, a user identifier associated with the requestor, or one or more user identifiers associated with the content object collaborators, or an object path associated with the content object, or an object parent associated with the content object.

11. The computer program product of claim 10, wherein the collaborators are determined based on one or more search attributes, the search attributes comprising at least one of, one or more search terms, or an enterprise filter, or any combination thereto.

12. The computer program product of claim 10, further comprising instructions which, when stored in memory and executed by a processor causes the processor to perform delivering a web application for operation on at least one user device to facilitate selection of at least one content object to determine a set of candidate collaborators.

13. The computer program product of claim 12, wherein the candidate collaborators are displayed in the web application.

14. The computer program product of claim 8, wherein the collaborator index is a table.

15. A system comprising:
a server in a cloud-based environment that is interfaced with one or more storage devices that store one or more content objects accessible by one or more collaborators; and
a processor having instructions which, when stored in memory and executed by the processor cause the processor to perform,
receiving a content object transaction request from a transaction requestor, the content object transaction request to result in a change of collaboration attributes pertaining to the content object;
maintaining a collaboration index as a database table, the database table comprising:
(i) a first column that identifies an object path associated with the content object,
(ii) a second column that identifies an object parent associated with the content object,
(iii) a third column that identifies user identifiers associated with the one or more collaborators; and
(iv) one or more database rows associated with the user identifiers from the third column, wherein a user is designated as a collaborator for the content object by inserting a database row for the user identified from the third column into the one or more database rows of the database table where the object path in the first column for the database row corresponds to the content object and one or more object parents for the content object associated with the user is included in the second column;
querying the database table to determine a set of potential content object collaborators for a current object by identifying the user identifiers from the third column from among the one or more database rows that are identified as having a current content object path or having a current content object parent path listed in at least one of the first column or the second column;
generating one or more updated database rows in the database table based at least in part on the set of content object collaborators; and
triggering an update to the collaborator index based at least in part on the one or more updated database rows.

16. The system of claim 15 wherein the content object transaction request is one of, a delete collaborator request, or an add collaborator request, or a delete object request, or a move object request.

17. The system of claim 15, wherein the updated database rows comprise at least some of, a user identifier associated with the requestor, or one or more user identifiers associated with the content object collaborators, or an object path associated with the content object, or an object parent associated with the content object.

18. The system of claim 17, wherein the collaborators are determined based on one or more search attributes, the search attributes comprising at least one of, one or more search terms, or an enterprise filter, or any combination thereto.

19. The system of claim 17, wherein the content object transaction request is one of, a delete collaborator request, or an add collaborator request, or a delete object request, or a move object request.

20. The system of claim 15, wherein the collaborator index is a table.

* * * * *